(12) United States Patent
Omura

(10) Patent No.: US 11,785,931 B2
(45) Date of Patent: Oct. 17, 2023

(54) HANGER FOR USE IN FISHING AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 49 days.

(21) Appl. No.: 17/243,774

(22) Filed: Apr. 29, 2021

(65) Prior Publication Data
US 2021/0352882 A1 Nov. 18, 2021

(30) Foreign Application Priority Data

May 13, 2020 (KR) .......................... 10-2020-0057026
Dec. 15, 2020 (KR) .......................... 10-2020-0175201

(51) Int. Cl.
*A01K 97/00* (2006.01)
*A01K 97/06* (2006.01)

(52) U.S. Cl.
CPC .................................. *A01K 97/06* (2013.01)

(58) Field of Classification Search
CPC ........ A01K 97/00; A01K 97/06; A01K 97/24; A01K 87/009; A01K 85/02; A01K 85/021; A01K 85/022
USPC ........................................ 43/54.1, 57.1, 57.2
See application file for complete search history.

(56) References Cited

U.S. PATENT DOCUMENTS 3,763,589 A * 10/1973 Werner .................. A01K 87/00
43/25.2
3,815,273 A 6/1974 Perkins

FOREIGN PATENT DOCUMENTS

| CN | 201418325 Y | 3/2010 | |
|---|---|---|---|
| JP | 08-024515 B2 | 3/1996 | |
| JP | 3053771 B * | 6/1996 | ............. A01K 87/00 |
| JP | 10-4828 A | 1/1998 | |
| JP | 3053771 B2 | 6/2000 | |
| JP | 2001-269085 A | 10/2001 | |
| JP | 3094224 U | 6/2003 | |
| JP | 6190328 B2 | 8/2017 | |
| JP | 2017-184653 A | 10/2017 | |
| JP | 2018-186758 A | 11/2018 | |
| KR | 20-2011-0009250 U | 9/2011 | |
| KR | 10-2014-0036578 A | 3/2014 | |

(Continued)

*Primary Examiner* — Joshua J Michener
*Assistant Examiner* — Henry Hooper Mudd
(74) *Attorney, Agent, or Firm* — Oblon, McClelland, Maier & Neustadt, L.L.P.

(57) ABSTRACT

A hanger for use in fishing, which is mounted on a rod body of a fishing rod and hangs a fish hook or a fishing line, is provided. The hanger includes a mounting shaft portion, a hanging portion, and a protection portion. The mounting shaft portion is fixed to an outer peripheral surface of the rod body. The hanging portion is supported by the mounting shaft portion and hangs the fish hook or the fishing line. The protection portion is rotatably coupled to the mounting shaft portion and covers the hanging portion. The protection portion is rotatable to an open position where the protection portion exposes the hanging portion and a closed position where the protection portion covers the hanging portion such that the hanging portion and the protection portion pinch the fish hook or the fishing line.

10 Claims, 21 Drawing Sheets

(56) References Cited

FOREIGN PATENT DOCUMENTS

KR         10-1579405 B1    12/2015
KR    20-2016-0003987 U    11/2016

\* cited by examiner

HANGER FOR USE IN FISHING AND FISHING ROD INCLUDING SAME

CROSS-REFERENCE TO RELATED APPLICATIONS

This application is based upon and claims the benefit of priorities from Korean Patent Application No. 10-2020-0057026, filed on May 13, 2020, and Korean Patent Application No. 10-2020-0175201, filed on Dec. 15, 2020, the entire contents of which are incorporated herein by reference.

TECHNICAL FIELD

The present disclosure relates to a hanger for hanging a fish hook or a fishing line, and a fishing rod including the same.

BACKGROUND

A fishing rig is a set of fishing tool that has parts such as a fishing float, a lure, or a fish hook for catching a fish. In some fishing rods, the fishing line is tied to a tip of the fishing rod, and the fishing rig is connected to an end of the fishing line. In a fishing rod using a reel, the fishing rig is connected to the end of the fishing line in the state where the fishing line reeled out from the reel is guided by fishing line guides mounted on the fishing rod.

When a fisherman goes fishing or takes a break during fishing, the fisherman leaves the fishing rig in the state where the fishing rig is connected to the end of the fishing line. If the fishing rig is left as it is, the fishing rig swinging through the fishing line may be easily entangled with the fishing rod. In addition, a dangerous situation can appear because the fish hook of the fishing rig may poke a person.

To prevent entanglement of the fishing line or the danger caused by the fish hook, a hanger for use in fishing, which hangs and holds the fish hook or the fishing line of the fishing rig, is known in the present technical field. The hanger for use in fishing is a fishing accessory part for keeping the fishing rig on a rod body of the fishing rod. Japanese Patent Publication No. 3053771 discloses a hanger for use in fishing that is mounted on a rod body of the fishing rod.

The conventional hanger for use in fishing, which is suggested by Japanese Patent Publication No. 3053771, has a main body that can selectively change its posture on the rod body. The main body can be changed to a standing state where it stands from an outer surface of the rod body of the fishing rod, and to a falling state where it falls to the outer surface of the rod body. The main body has a seating portion to be seated on the outer surface of the rod body, and an arm portion extending from the seating portion. A hanging portion to which the fish hook is hung is provided at a tip of the arm portion.

According to the conventional hanger for use in fishing suggested by the aforementioned patent document, the arm portion extends in a direction away from the rod body of the fishing rod in the standing state of the main body. In the standing state of the main body, the hanging portion provided at the tip of the arm portion is maintained in an exposed state. Accordingly, even if the arm portion hangs and holds the fish hook, the fish hook can easily escape from the hanging portion due to swinging movement.

Fishermen demand that the operation of hanging the fish hook on the hanger be performed effortlessly and easily. In order to address such a demand, it is desirable to maintain a constant spacing between the rod body of the fishing rod and a portion of the hanger for hanging the fish hook. During fishing, the fishing line can frequently become loose. The loosened fishing line can be wound around the hanger and become entangled with the hanger, and as a result, line entanglement of the fishing line and the damage of the fishing line can occur. However, the conventional hanger for use in fishing does not exhibit sufficient effect in terms of easy hanging operation and reliable prevention of line entanglement.

SUMMARY

Disclosed embodiments provide a hanger for use in fishing that solves at least one or more of the aforementioned problems of the conventional technology. One embodiment provides a hanger for use in fishing which can continuously and reliably maintain the hung state of a fish hook or a fishing line. One embodiment provides a hanger for use in fishing which prevents the hung state of the fish hook or the fishing line from being released even if the fishing line tied to a tip of the fishing rod or guided by a fishing line guide becomes loose. One embodiment provides a hanger for use in fishing which prevents a line tangle of the fishing line even if the loose fishing line is swung like being wound around the hanger, and does not damage the fishing line in the event of the line tangle of the fishing line. One embodiment provides a hanger for use in fishing which enables a fisherman to perform the operation of hanging a fishing rig effortlessly and easily. Further, the disclosed embodiments provide a fishing rod including the above-described hanger for use in fishing.

One aspect of the disclosed embodiments relates to a hanger for use in fishing which is mounted on a rod body of a fishing rod and hangs a fishing line or a fish hook. The hanger for use in fishing according to one embodiment includes a mounting shaft portion, a hanging portion, and a protection portion. The mounting shaft portion is fixed to an outer peripheral surface of the rod body. The hanging portion is supported by the mounting shaft portion. The hanging portion is configured to hang the fish hook or the fishing line. The protection portion is rotatably coupled to the mounting shaft portion and is configured to cover the hanging portion. The protection portion includes: a coupling portion coupled to the mounting shaft portion so as to be rotatable about a central axis of the mounting shaft portion in the state of being in contact with the outer peripheral surface of the rod body; and an accommodation portion extending from the coupling portion and accommodating the hanging portion. The protection portion is rotatable to: an open position where the protection portion exposes the hanging portion; and a closed position where the protection portion covers the hanging portion and the hanging portion is accommodated in the accommodation portion such that the hanging portion and the protection portion pinch the fish hook or the fishing line.

In one embodiment, the protection portion includes a pressing portion which is located adjacent to the accommodation portion and presses the fish hook or the fishing line toward the outer peripheral surface of the rod body in the closed position.

In one embodiment, the protection portion includes a protruding portion which is located in front of the pressing portion and protrudes from the accommodation portion in a direction away from the central axis of the mounting shaft portion.

In one embodiment, the protection portion includes, at the protruding portion, a contact surface facing toward the central axis. The contact surface is configured to be brought into contact with a front end of the hanging portion and to press the hanging portion toward the rod body when the protection portion is rotated from the open position to the closed position.

In one embodiment, the coupling portion of the protection portion includes: an insertion portion into which a portion of the hanging portion is inserted when the protection portion is rotated from the closed position to the open position; and a pushing-up surface formed at the insertion portion and brought into contact with the portion of the hanging portion. As the protection portion is rotated from the closed position to the open position, the coupling portion rotates the portion of the hanging portion by the pushing-up surface.

In one embodiment, when the hanger for use in fishing is viewed from a lateral side, the coupling portion is in contact with the outer peripheral surface of the rod body at a first contact point in a state where the protection portion is in contact with the outer peripheral surface of the rod body in the closed position. When the hanger for use in fishing is viewed from a lateral side, during rotation of the protection portion from the closed position to the open position, the coupling portion is in contact with the outer peripheral surface of the rod body at a second contact point that is most distant from the central axis of the mounting shaft portion. When the hanger for use in fishing is viewed from a lateral side, the coupling portion is formed in a shape that has an arcuately curved contour line between the first contact point and the second contact point such that the first contact point is located inside an imaginary circle, which is centered on the central axis and passes through the second contact point.

In one embodiment, the hanging portion includes a fitting portion coupled to the mounting shaft portion through interference fit. The fitting portion is configured to apply a coupling force, which prevents the hanging portion from rotating with respect to the mounting shaft portion when the protection portion is not in contact with the hanging portion, to the mounting shaft portion.

In one embodiment, the fitting portion of the hanging portion includes a fitting hole into which the mounting shaft portion is fitted, and a slot portion communicating with the fitting hole. The mounting shaft portion is interference-fitted to the fitting hole through the slot portion.

In one embodiment, the mounting shaft portion includes a shaft portion to which the hanging portion and the protection portion are coupled; and a pair of mounting portions respectively provided at both ends of the shaft portion. An elastic band for fixing the mounting shaft portion to the rod body is engaged with the pair of mounting portions. At least one of the pair of mounting portions fits with the shaft portion.

Another aspect of the disclosed embodiments relates to a fishing rod including the hanger for use in fishing according to above-described embodiments. The fishing rod according to one embodiment includes a rod body, and the hanger for use in fishing according to one embodiment. The hanger for use in fishing is mounted on the outer peripheral surface of the rod body by an elastic band, which is wound around the outer peripheral surface of the rod body and is engaged with the mounting shaft portion of the hanger for use in fishing.

According to the hanger for use in fishing of one embodiment, in the closed position of the protection portion, the protection portion is rotated to the hanging portion hanging the fish hook or the fishing line, and covers the hanging portion. Therefore, the hanger for use in fishing of one embodiment can pinch the fish hook or the fishing line by the hanging portion and the protection portion, and can continuously and reliably maintain the hung state of the fish hook or the fishing line. Further, even if the fishing line becomes loose or the fish hook is swung, the fish hook or the fishing line can be kept on the rod body by the hanger without being released from the hung state. Further, since the hanger for use in fishing of one embodiment can maintain the hanging portion at a predetermined position, the hanger enables a fisherman to easily perform the operation of hanging the fish hook.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
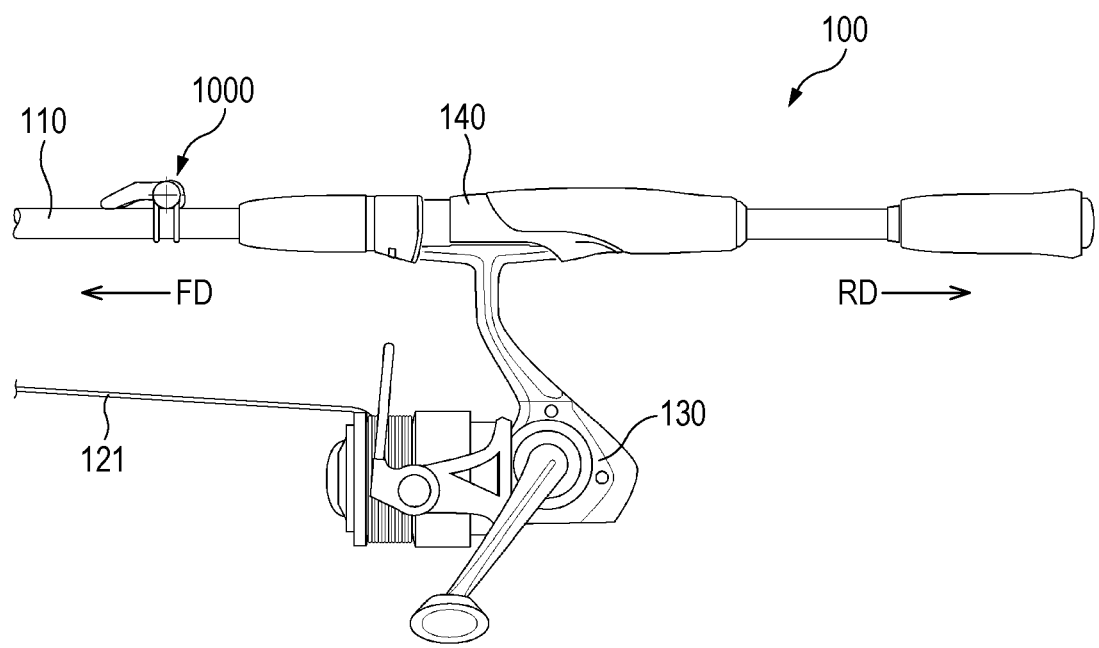
FIG. 1 is a side view showing a fishing rod including a hanger for use in fishing according to one embodiment.

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions.

Singular expressions described in the present disclosure may encompass plural expressions unless otherwise mentioned, which will also be applied to singular expressions recited in the claims.

Expressions such as "first," "second," etc. used in the present disclosure are used to separate a plurality of elements from each other, and are not intended to limit an order or importance of the elements.

In the present disclosure, the description that one element is "connected" or "coupled" to another element should be understood to indicate that the aforesaid one element may be directly connected, or coupled, to the aforesaid another element, and should be further understood that the aforesaid one element may be connected or coupled to the aforesaid another element via a new element.

The directional terms "frontward," "front" and the like used in the present disclosure mean a direction directed toward a tip of a fishing rod, while the directional terms "rearward," "rear" and the like mean a direction directed toward a butt of a fishing rod. The directional terms "upward," "upper" and the like used in the present disclosure and the directional terms "downward," "lower" and the like used in the present disclosure are based on the orientation shown in the accompanying drawings.

Hereinafter, embodiments of the present disclosure will be described with reference to the accompanying drawings. Like reference numerals in the drawings denote like or corresponding elements. Further, in the following description of the embodiments, redundant descriptions for the same or corresponding elements may be omitted. However, even if the descriptions of the elements are omitted, such elements are not intended to be excluded in any embodiment.

FIG. 1 shows a portion of a fishing rod including a hanger for use in fishing according to one embodiment of the present disclosure. In FIG. 1, an arrow FD indicates a frontward direction toward a tip of the fishing rod, while an arrow RD indicates a rearward direction toward a butt of the fishing rod. FIG. 1 shows a portion of a fishing rod according to one embodiment in the vicinity of a butt.

The fishing rod 100 includes a rod body 110. The rod body 110 is a structure that is capable of elastically deforming in response to external forces applied during fishing and maintains a thin and long shape of the fishing rod. The rod body may consist of one member or a plurality of members. A member constituting the rod body may be a thin and long tubular member, or may be a member that is thin and long but is solid. Where the rod body consists of a plurality of members, the plurality of members may be interconnected by a connection manner such as a joined type or a telescopic type.

The fishing rod 100 includes a fishing line 121. A fishing rig (not shown) is provided at a leading end of the fishing line 121. The fishing rig means a set of tools connected to the leading end of the fishing line. By way of example, the fishing rig may include a portion of a fishing line, a fish hook, a fishing float or a lure.

The fishing rod 100 includes a reel 130 for reeling out or winding the fishing line 121, and a reel seat 140 configured to attach the reel 130 to the rod body 110. The reel seat 140 may be attached to the rod body 110 in such a manner that the rod body 110 is fitted into the reel seat 140 in an axial direction of the rod body.

The fishing rod 100 may include a plurality of fishing line guides (not shown) that are attached to the rod body 110 and guide the fishing line. A fishing line guide guides the fishing line which is reeled out from the reel 130 when casting the fishing rig or is wound around the reel 130 when landing a fish. Such a fishing line guide may be attached to the rod body 110 by means of a wrapping thread, or may be attached to the rod body 110 in a fitting manner.

The fishing rod 100 according to one embodiment includes a hanger 1000 for use in fishing (hereinafter, simply referred to as a hanger) according to one embodiment, which is capable of keeping a fish hook or a fishing line on the rod body 110. The hanger 1000 is configured to hang the fishing line 121 or the fish hook in order to position a portion of the fishing rig (e.g., a portion of the fishing line 121 or the fish hook) near an outer peripheral surface of the rod body 110. The hanger 1000 is removably mounted on the outer peripheral surface of the rod body 110.

Figure 2:
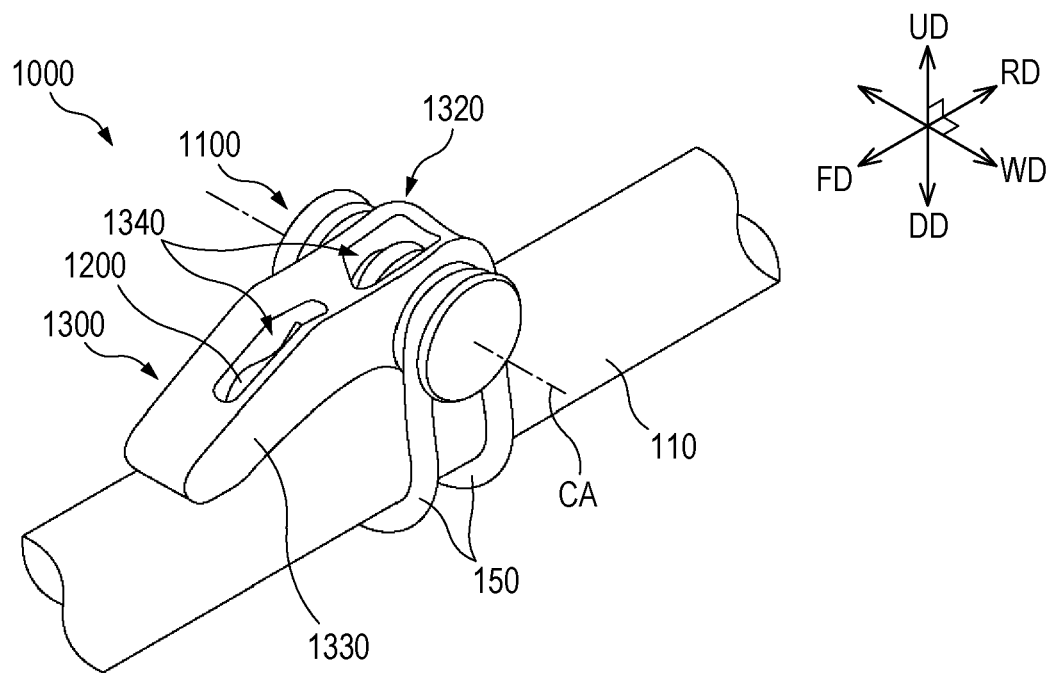
FIG. 2 is a perspective view showing a hanger for use in fishing according to one embodiment.
Figure 3:
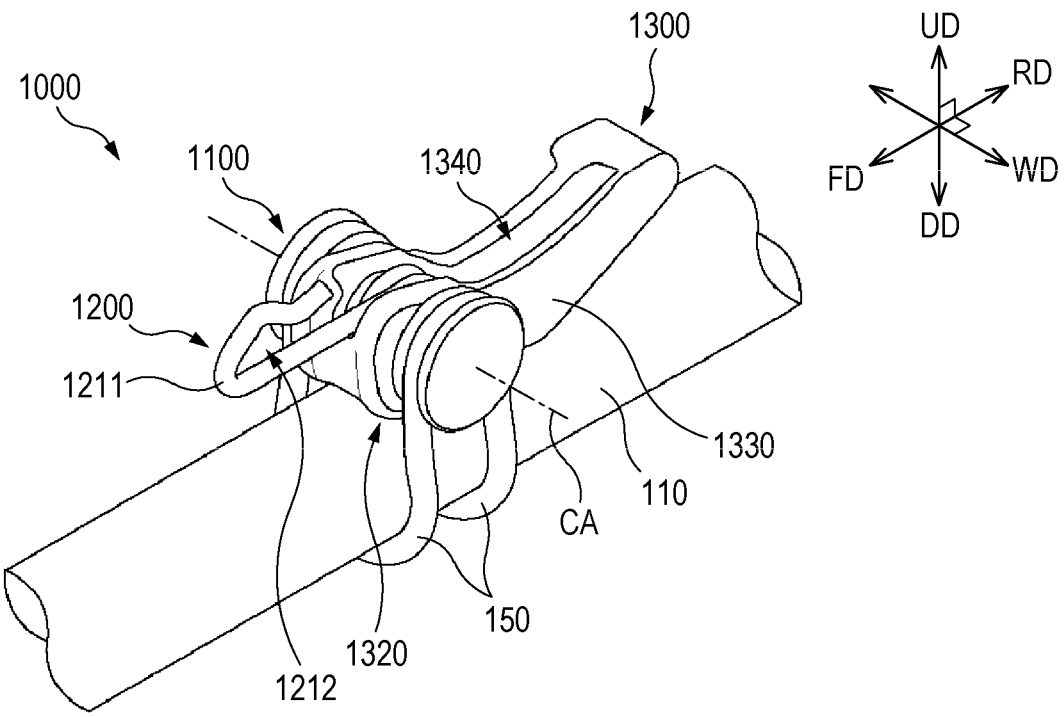
FIG. 3 is another perspective view showing a hanger for use in fishing according to one embodiment.

Reference is made to FIGS. 2 and 3 showing the hanger according to one embodiment. The hanger 1000 according to one embodiment includes a mounting shaft portion 1100, a hanging portion 1200 held and supported by the mounting shaft portion 1100, and a protection portion 1300 rotatably coupled to the mounting shaft portion 1100.

The mounting shaft portion 1100 is a base for mounting the hanger 1000 on the rod body 110. The mounting shaft portion 1100 holds the hanging portion 1200 and rotatably supports the protection portion 1300. The mounting shaft portion 1100 may be disposed on the rod body 110 in a width direction WD orthogonal to a longitudinal direction (a direction including a frontward direction FD and a rearward direction RD) of the rod body 110. The mounting shaft portion 1100 may be removably mounted on the rod body 110 by means of an elastic member. By way of example, an elastic band 150 is wound around the outer peripheral surface of the rod body 110 and is engaged with the mounting shaft portion 1100, thereby mounting the hanger 1000 on the outer peripheral surface of the rod body 110. The elastic band 150 is wound around the outer peripheral surface of the rod body 110 in the width direction WD and is engaged with respective ends of the mounting shaft portion 1100 in the width direction WD, thereby fixing the mounting shaft portion 1100 to the outer peripheral surface of the rod body 110.

The hanging portion 1200 is coupled to the mounting shaft portion 1100 and extends from the mounting shaft portion 1100. The hanging portion 1200 is configured to hang a portion of the fishing rig (e.g., the fish hook or the fishing line connected to the fish hook). A portion of the hanging portion 1200 in the vicinity of a front end 1211 of the hanging portion 1200 (an end portion of the hanging portion directed to the tip of the fishing rod) is formed in a shape of a hook. Thus, the hanging portion 1200 has a gap 1212 in the vicinity of the front end 1211. The gap 1212 allows the fish hook (e.g., the fish hook 122 shown in FIG. 5B) or the fishing line (e.g., the fishing line 121 shown in FIG. 5C) to be hung to the hanging portion 1200.

The protection portion 1300 is coupled to the mounting shaft portion 1100 so as to be rotatable in the frontward direction FD and the rearward direction RD. A rotation center of the protection portion 1300 may be a central axis CA of the mounting shaft portion 1100. The protection portion 1300 is configured to cover the hanging portion 1200. If the protection portion 1300 covers the hanging portion 1200, the hanging portion 1200 can be hidden in the protection portion 1300. The protection portion 1300 may be formed in a shape of an arm that is rotatable with respect to the mounting shaft portion 1100. The protection portion 1300 includes a coupling portion 1320 rotatably coupled to the mounting shaft portion 1100, an arm portion 1330 extending from the coupling portion 1320, and an accommodation portion 1340 formed throughout the coupling portion 1320 and the arm portion 1330. The coupling portion 1320 is rotatable about the mounting shaft portion 1100 in the state of being in contact with the outer peripheral surface of the rod body 110. The accommodation portion 1340 is formed so as to accommodate the hanging portion 1200, and extends from the coupling portion 1320 in a direction away from the central axis CA. The accommodation portion 1340 spaces the protection portion 1300 and the hanging portion 1200 from each other so that a lower surface of the protection portion 1300 and an upper surface of the hanging portion 1200 do not make contact with each other.

The protection portion 1300 may be positioned to a position where the protection portion 1300 is rotated in the frontward direction FD such that the protection portion 1300 covers the hanging portion 1200 and hide the hanging portion 1200 (hereinafter, such a position is referred to as a closed position). The protection portion 1300 may be positioned to a position where the protection portion 1300 is rotated in the rearward direction RD so as to expose the hanging portion 1200 (hereinafter, such a position is referred to as an open position). The protection portion 1300 can be rotated to the closed position or the open position in the frontward direction FD and the rearward direction RD about the central axis CA of the mounting shaft portion. Thus, the position of the protection portion can be changed reversibly.

FIG. 2 shows that the protection portion 1300 is rotated frontward and is positioned to the closed position thereby. In the closed position shown in FIG. 2, the hanging portion 1200 is accommodated in the accommodation portion 1340 of the protection portion. Further, in the closed position of the protection portion 1300, the hanging portion 1200 and the protection portion 1300 can pinch the fish hook or the fishing line. FIG. 3 shows that the protection portion 1300 is rotated rearward and is rotated to the open position thereby. In the open position shown in FIG. 3, the hanging portion 1200 is fully exposed so that the fish hook or the fishing line can be hung to the hanging portion 1200. In the closed position and the open position of the protection portion 1300, the protection portion 1300 is in contact with the outer peripheral surface of the rod body 110 at a circumferential surface of the coupling portion 1320. Therefore, the mounting shaft portion 1100 is not in direct contact with the outer peripheral surface of the rod body 110, and is spaced apart from the outer peripheral surface of the rod body 110 by the coupling portion 1320 of the protection portion.

Figure 4:
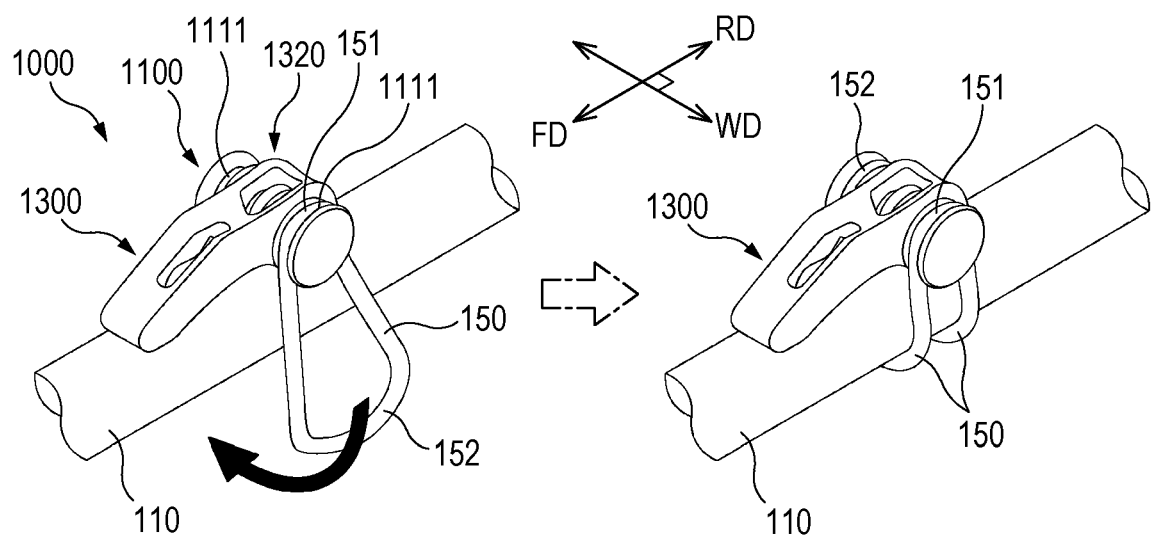
FIG. 4 is a perspective view showing an example where a hanger for use in fishing according to one embodiment is mounted on a rod body of a fishing rod.

Reference is made to FIG. 4 showing an example of mounting the hanger according to one embodiment on the rod body of the fishing rod. The hanger 1000 according to one embodiment can be mounted on the outer peripheral surface of the rod body 110 through a band binding manner. The elastic band 150 having elasticity and stretchability is used for the band binding manner. The elastic band 150 may include, for example, a rubber band having an O-ring shape, but may include any member that has elasticity and stretchability and can be formed as a band.

The mounting shaft portion 1100 is disposed on the outer peripheral surface of the rod body 110 at a desired position. The mounting shaft portion 1100 is disposed on the rod body 110 in the width direction WD. A portion of the elastic band 150 is engaged with each end portion of the mounting shaft portion 1100 in the width direction WD. The mounting shaft portion 1100 of one embodiment has a band groove 1111 at each end portion in the width direction WD, and a portion of the elastic band 150 can be engaged with the band groove 1111.

In the state where the mounting shaft portion 1100 is disposed on the outer peripheral surface of the rod body 110, one end portion 151 of the elastic band 150 is engaged with one of the band grooves 1111 of the mounting shaft portion 1100. Thereafter, the elastic band 150 is wound along the outer peripheral surface of the rod body 110 while an opposite end portion 152 located opposite the one end portion 151 is being pulled in the width direction WD. Thereafter, the opposite end portion 152 of the elastic band 150 is engaged with the other of the band grooves 1111 of the mounting shaft portion 1100. As such, a portion of the elastic band 150 is engaged with the mounting shaft portion 1100 and the elastic band 150 is wound around the outer peripheral surface of the rod body 110. Therefore, the elastic band 150 fixes the mounting shaft portion 1100 to the rod body 110 and mounts the hanger 1000 on the outer peripheral surface of the rod body 110.

Due to an elastic force of the elastic band 150, the mounting shaft portion 1100 is fixed to the outer peripheral surface of the rod body 110 and can be mounted on the rod body 110. The mounting shaft portion 1100 is strongly pressed toward the outer peripheral surface of the rod body 110 by the elastic force of the elastic band 150. Since an outer surface of the protection portion 1300 (specifically, a circumferential surface of the coupling portion 1320) is in strong contact with the outer peripheral surface of the rod body 110 by the elastic force of the elastic band 150, frictional resistance can be generated between the outer surface of the protection portion 1300 and the outer peripheral surface of the rod body 110. Due to the frictional resistance generated by the elastic force of the elastic band 150, the mounting shaft portion 1100 can be maintained in the state of being fixed to the rod body 110 without rotation.

Figure 5A:
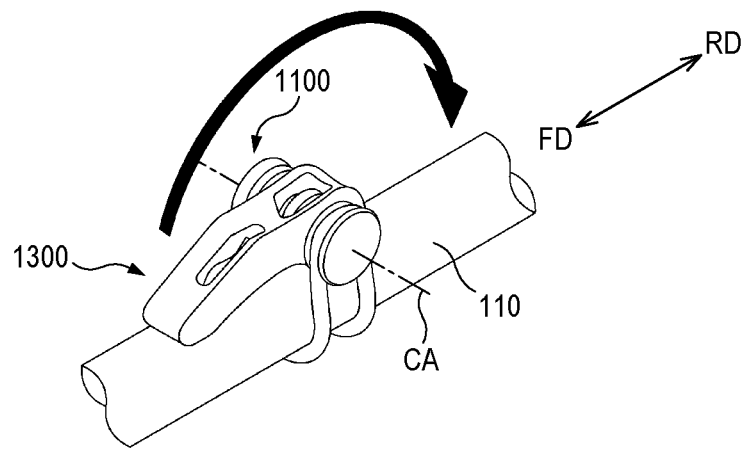
FIG. 5A is a perspective view showing an example where a protection portion of a hanger for use in fishing according to one embodiment is positioned in a closed position.
Figure 5B:
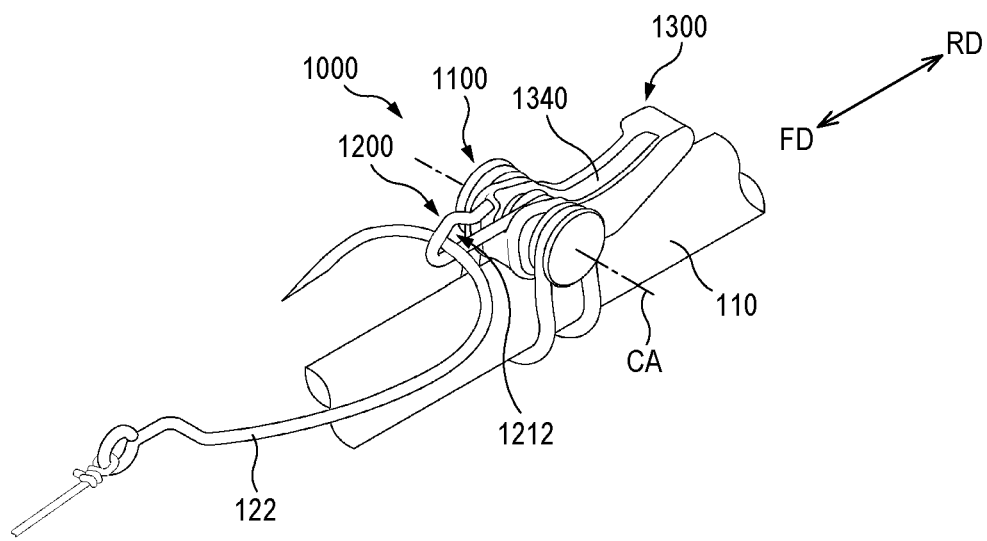
FIG. 5B is a perspective view showing an example where a protection portion of a hanger for use in fishing according to one embodiment is positioned in an open position.
Figure 5C:
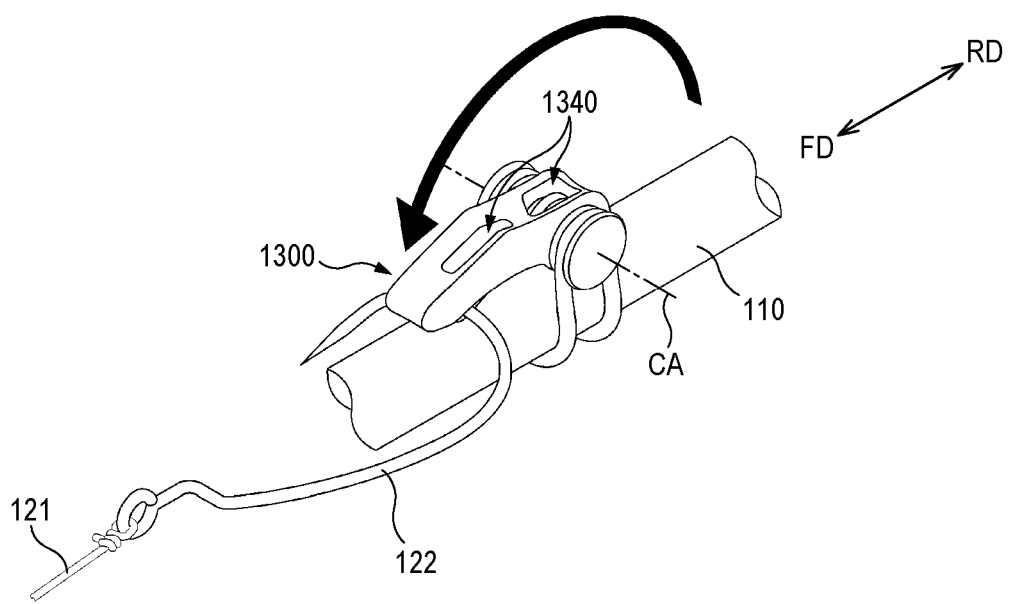
FIG. 5C is a perspective view showing an example where a hanger for use in fishing according to one embodiment hangs a fish hook and keeps the fish hook on a rod body.

FIGS. 5A to 5C show an example where the hanger according to one embodiment hangs the fish hook and keeps the fish hook on the rod body. Referring to FIG. 5A, to hang a portion of a fishing rig (the fishing line or the fish hook) by the hanger 1000, the protection portion 1300 is rotated in the rearward direction RD about the central axis CA of the mounting shaft portion and is positioned in the open position. Therefore, the hanging portion 1200 is exposed. Referring to FIG. 5B, in the state where the hanging portion 1200 is exposed, the fish hook 122 can be inserted into the gap 1212 of the hanging portion and the hanging portion 1200 can hang the fish hook 122. After the fish hook 122 is hung to the hanging portion 1200, the protection portion 1300 is rotated in the frontward direction FD about the central axis CA of the mounting shaft portion and is positioned in the closed position. If the protection portion 1300 is rotated to the closed position, the hanging portion 1200 is inserted into and accommodated in the accommodation portion 1340 of the protection portion, and is covered by the protection portion 1300. Referring to FIG. 5C, in the state where the protection portion 1300 covers and accommodates the hanging portion 1200 in the closed position, the fish hook 122 is pinched by the hanging portion 1200 and the protection portion 1300. That is, the hanger 1000 hangs the fish hook 122 and keeps the fish hook 122 on the rod body 110 by a manner of pinching the fish hook 122 by the hanging portion 1200 and the protection portion 1300.

As the protection portion 1300 is rotated from the open position to the closed position, the hanging portion 1200 is inserted into the accommodation portion 1340 of the protection portion 1300. When the protection portion 1300 is fully rotated to the closed position, the protection portion 1300 is accommodated in the accommodation portion 1340 and is covered by the protection portion 1300. That is, as the protection portion 1300 is rotated to the closed position, the protection portion 1300 performs the motion of covering the hanging portion 1200. When the protection portion 1300 is rotated to the closed position toward the hanging portion 1200, a portion of the fish hook 122 is hung to the hanging portion 1200 and is covered by the protection portion 1300. Therefore, the hanger 1000 hangs and holds the fish hook 122 in a manner of pinching the fish hook 122 by the hanging portion 1200 and the protection portion 1300. Where a portion of the fishing line 121 is hung to the hanging portion 1200 instead of the fish hook 122, the hanger 1000 can hang and hold the fishing line in a manner of pinching the fishing line by the hanging portion 1200 and the protection portion 1300.

Figure 6:
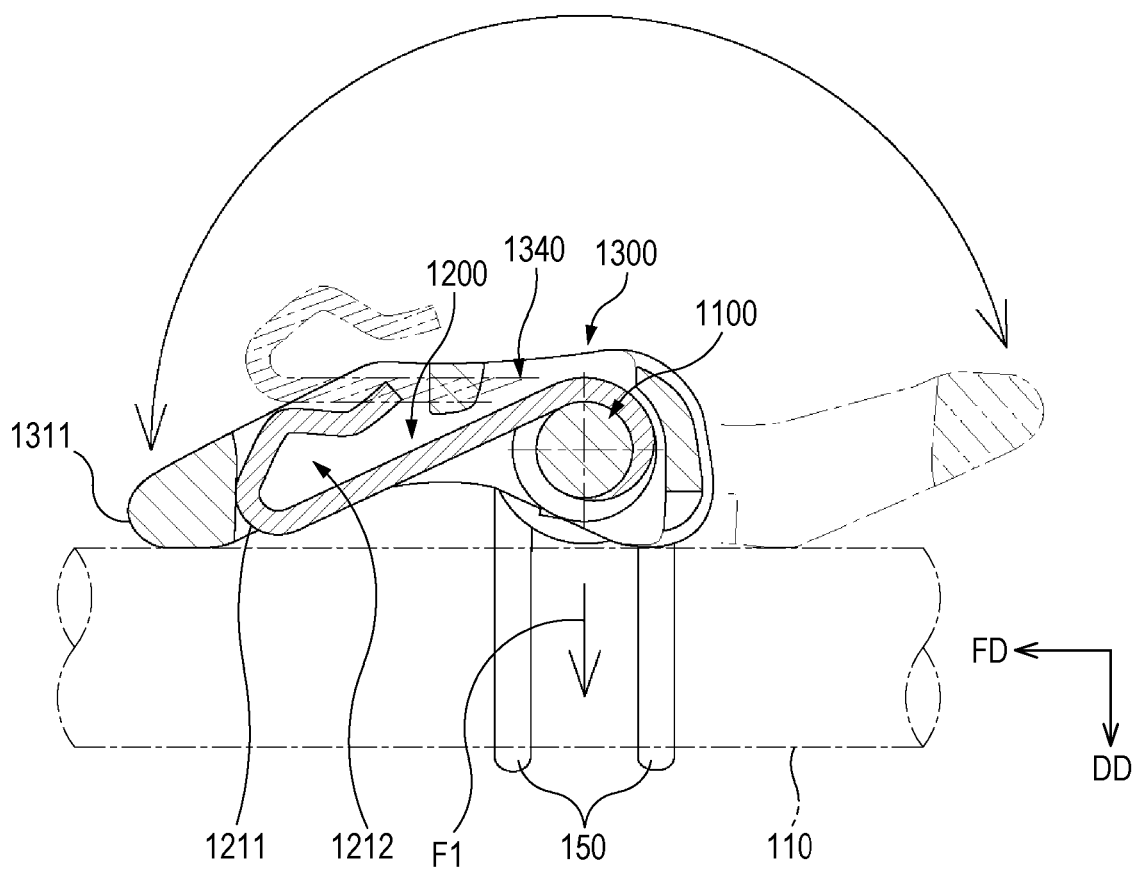
FIG. 6 is a longitudinal cross-sectional view showing an example where a hanging portion and a protection portion in a hanger for use in fishing according to one embodiment are operated.

FIG. 6 shows an example where the hanging portion and the protection portion are operated. In FIG. 6, solid lines show the protection portion and the hanging portion in the closed position, and alternating long and short dash lines show the protection portion and the hanging portion in the open position.

The elastic force F1 of the elastic band 150 acts in a direction of pressing the mounting shaft portion 1100 toward the rod body 110 (in a downward direction DD in FIG. 6). The protection portion 1300 is rotated to the closed position and the open position in the state where the mounting shaft portion 1100 is subjected to the elastic force F1. The elastic force F1 of the elastic band 150 stops the mounting shaft portion 1100 from rotation despite the rotation of the protection portion 1300. That is, when the protection portion 1300 is rotated to the open position or the closed position, the mounting shaft portion 1100 is fixed to the rod body 110 together with the elastic band 150. The hanging portion 1200 supported by the mounting shaft portion 1100 is separated from the protection portion 1300. Thus, when the protection portion 1300 is rotated to the open position, the hanging portion 1200 is not rotated together with the rotation of the protection portion 1300. Accordingly, when the protection portion 1300 is rotated to the open position, the front end 1211 of the hanging portion 1200 maintains the state of being directed in the frontward direction FD (i.e., directed toward the tip of the fishing rod). Therefore, the operation of hanging a fish hook or a fishing line to the hanging portion 1200 through the gap 1212 can be performed effortlessly and easily.

Figure 7:
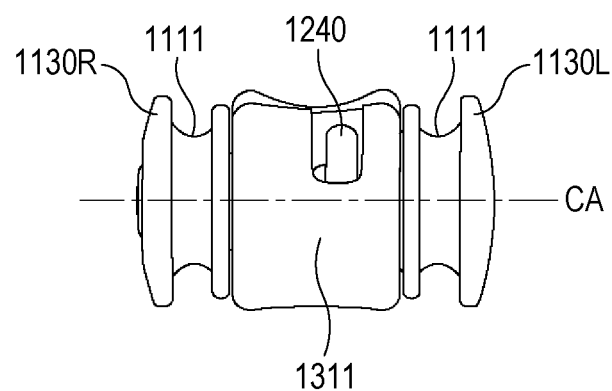
FIG. 7 is a front view of the hanger for use in fishing shown in FIG. 2.
Figure 8:
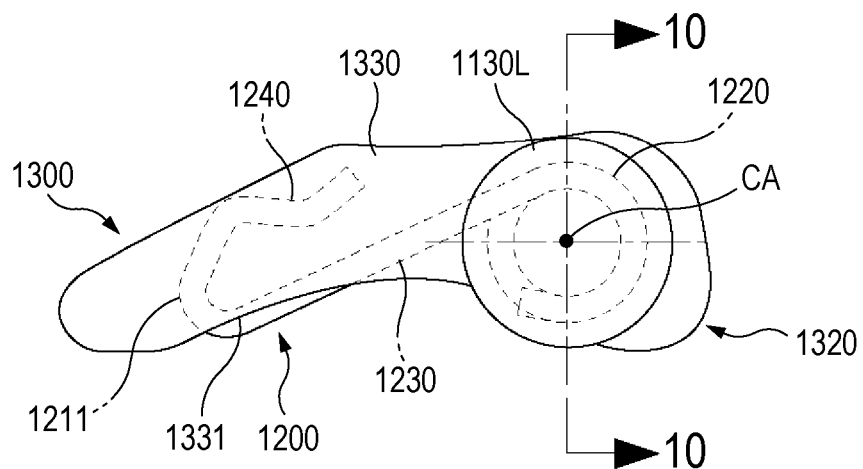
FIG. 8 is a side view of the hanger for use in fishing shown in FIG. 2.
Figure 9:
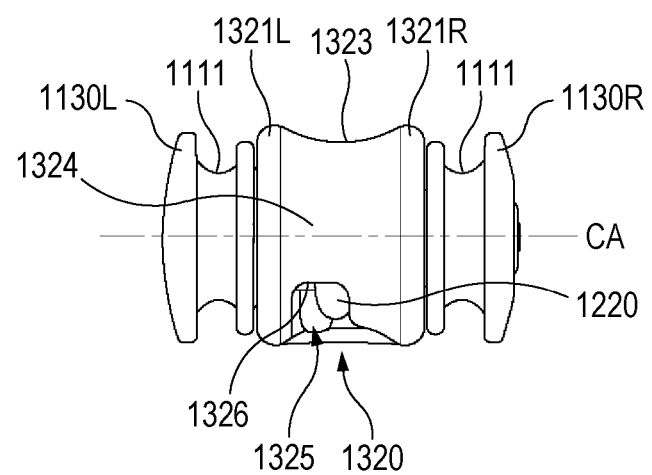
FIG. 9 is a rear view of the hanger for use in fishing shown in FIG. 2.
Figure 10:
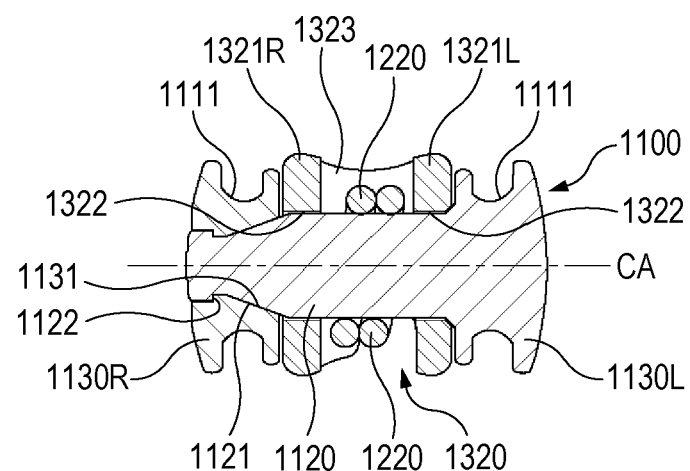
FIG. 10 is a cross-sectional view taken along line 10-10 of FIG. 8.
Figure 11:
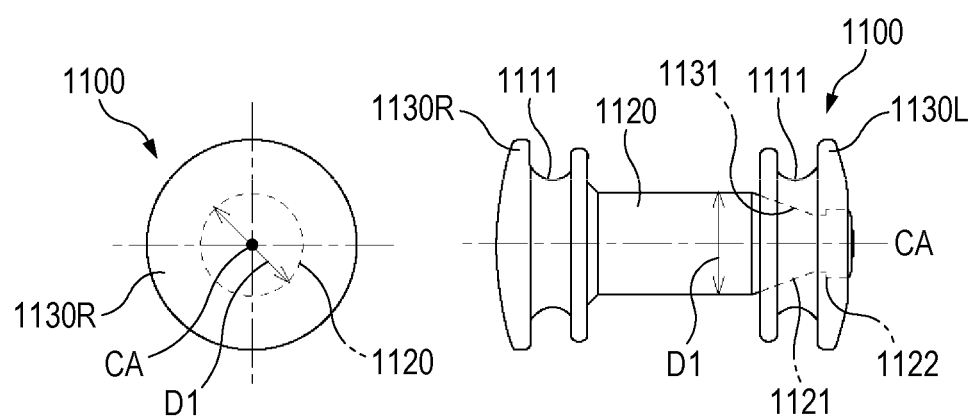
FIG. 11 shows a side view and a front view of a mounting shaft portion according to one embodiment.
Figure 12:
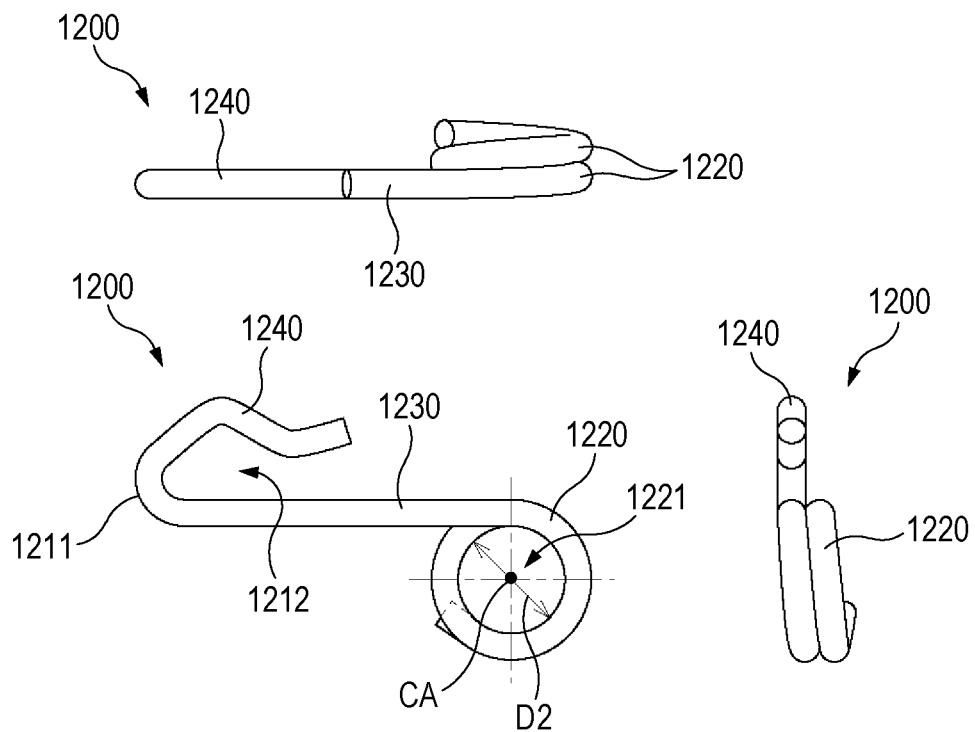
FIG. 12 shows a plan view, a front view and a right side view of a hanging portion according to one embodiment.
Figure 13:
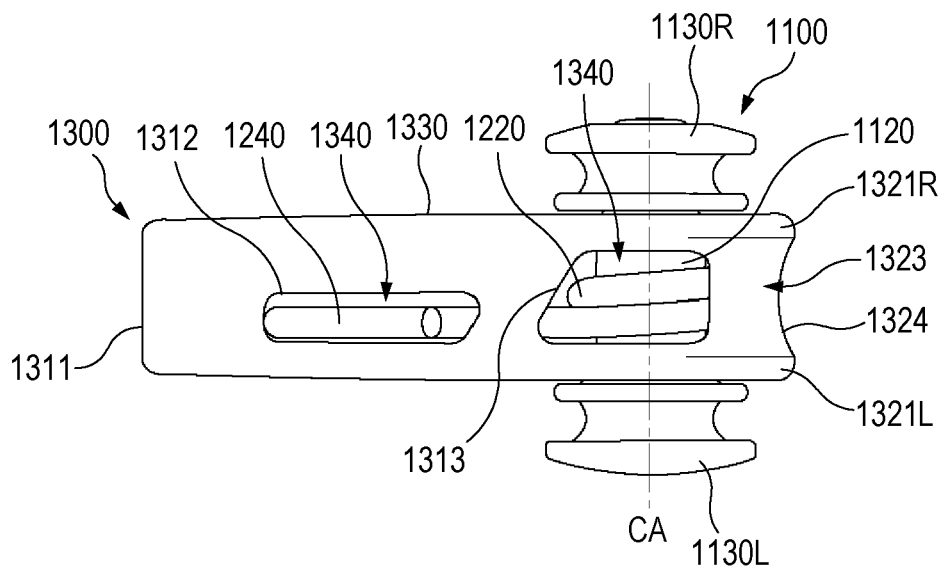
FIG. 13 is a plan view of the hanger shown in FIG. 2.
Figure 14:
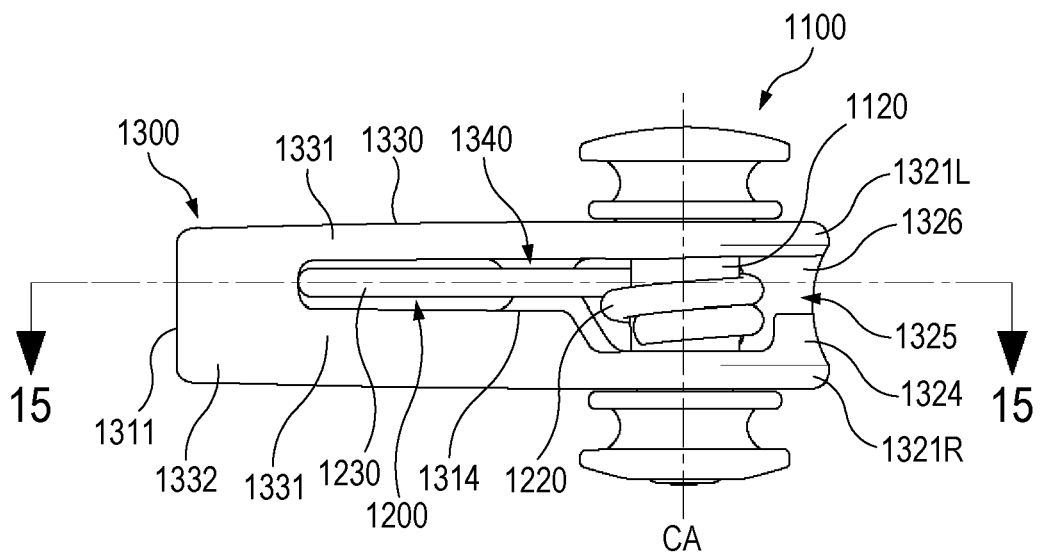
FIG. 14 is a bottom view of the hanger shown in FIG. 2.
Figure 15:
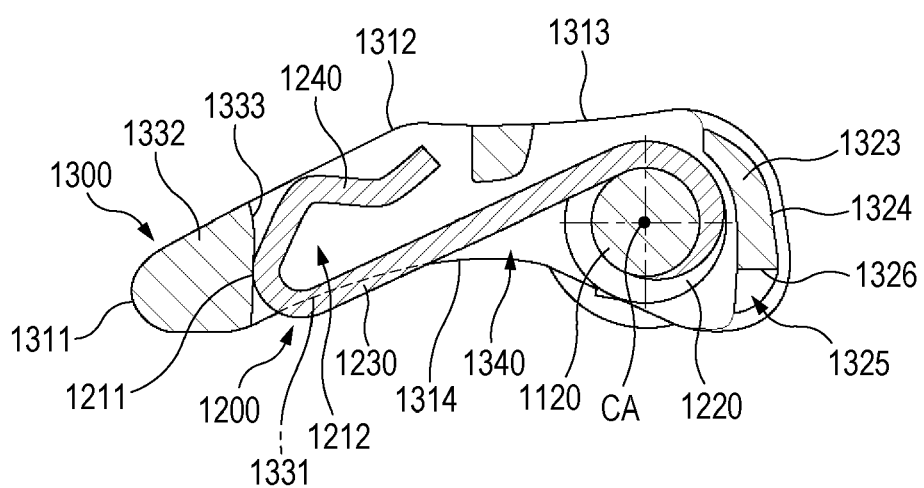
FIG. 15 is a cross-sectional view taken along line 15-15 of FIG. 14.
Figure 16:
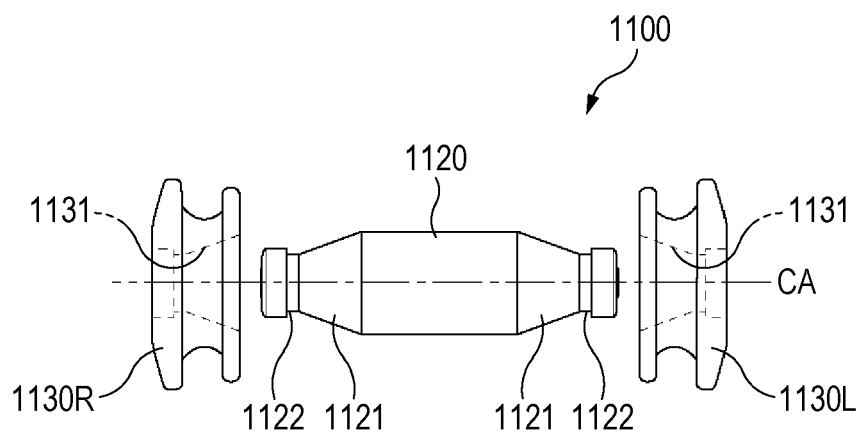
FIG. 16 is an exploded front view showing another example of a mounting shaft portion.

FIGS. 7 to 9 are a front view, a side view and a rear view of the hanger shown in FIG. 2, respectively. FIG. 10 is a cross-sectional view taken along line 10-10 of FIG. 8. FIG. 11 shows a side view and a front view of the mounting shaft portion according to one embodiment. FIG. 12 shows a plan view, a front view and a right side view of the hanging portion according to one embodiment. FIGS. 13 and 14 are a plan view and a bottom view of the hanger shown in FIG. 2, respectively. FIG. 15 is a cross-sectional view taken along line 15-15 of FIG. 14. FIG. 16 is an exploded front view showing another example of the mounting shaft portion. Detailed descriptions are made as to each element of the hanger according to one embodiment with reference to FIGS. 7 to 16.

Referring to FIGS. 10 and 11, the mounting shaft portion 1100 has a shaft portion 1120, and a pair of mounting portions 1130L and 1130R respectively provided at both ends of the shaft portion 1120 in the width direction. The shaft portion 1120 has a cylindrical shape, and the mounting portions 1130L and 1130R have a cylindrical shape or a shape of a circular disk. The shaft portion 1120 and the mounting portions 1130L and 1130R are located along the central axis CA of the mounting shaft portion. The hanging portion and the protection portion are coupled to the shaft portion 1120. The elastic band for fixing the mounting shaft portion 1100 to the rod body is engaged with the mounting portions 1130L and 1130R. The mounting portions 1130L and 1130R have, in an outer peripheral surface thereof, the band groove 1111 extending in a circumferential direction of the central axis CA. When the mounting shaft portion 1100 is mounted on the rod body, the elastic band is engaged with the band grooves 1111. The shaft portion 1120 has an outer diameter D1. The mounting portions 1130L and 1130R have a diameter greater than the outer diameter D1 of the shaft portion 1120. Alternatively, the shaft portion 1120 and the mounting portions 1130L and 1130R may have the same diameter, or the mounting portions 1130L and 1130R may have a diameter less than the outer diameter of the shaft portion 1120. Alternatively, the mounting shaft portion 1100 may consist of only the shaft portion 1120, and such a shaft portion 1120 may be configured such that both ends thereof are engaged with the elastic band.

In one embodiment, one of the pair of mounting portions 1130L and 1130R is integrally formed together with the shaft portion 1120, and the other of the pair of mounting portions 1130L and 1130R is configured to fit with an end portion of the shaft portion 1120. The shaft portion 1120 has, at the vicinity of the end portion thereof, a tapering surface 1121 and a stepped surface 1122. The tapering surface 1121 has a diameter gradually decreasing toward an end of the shaft portion. The stepped surface 1122 connects with the tapering surface 1121, and makes a step connecting with the tapering surface 1121. A fitting hole 1131 is perforated through one mounting portion 1130R of the pair of mounting portions in a direction of the central axis CA. The end portion of the shaft portion 1120, in which the tapering surface 1121 and the stepped surface 1122 are provided, is inserted and fitted into the fitting hole 1131. The fitting hole 1131 has a shape complementary to the shapes of the tapering surface 1121 and the stepped surface 1122. Since the mounting shaft portion 1100 is configured by fitting the shaft portion 1120 to the mounting portion 1130R, the mounting shaft portion 1100 can be manufactured with a small number of assembly processes.

The mounting shaft portion 1100 may be configured by fitting the shaft portion 1120 to all of the pair of mounting portions. Referring to FIG. 16, the shaft portion 1120 may have the tapering surface 1121 and the stepped surface 1122 at the vicinity of each end portion. The mounting shaft portion 1100 may be configured by fitting each end portion of the shaft portion 1120 to the fitting hole 1131 of each of the mounting portions 1130L and 1130R. That is, as shown in FIG. 16, the shaft portion 1120 and the pair of mounting portions 1130L and 1130R may be formed individually.

The hanging portion 1200 may be manufactured from a metallic wire material having elasticity. Any metallic material having elasticity may be used as a material of the metallic wire material. The metallic material having elasticity may include SW-C (hard drawn steel wire), SWP-A/B (piano wire type A/type B), or SUS304-WPB/SUS316-WPB (stainless steel wire), but is not limited thereto.

Reference is made to FIG. 12 showing the hanging portion. The hanging portion 1200 has the gap 1212 to which the fishing line or the fish hook is hung. The gap 1212 may be formed by a bent portion of the hanging portion 1200 or may be formed as an opening perforated through the hanging portion 1200. The hanging portion 1200 has a fitting portion 1220 coupled to the shaft portion of the mounting shaft portion, an arm portion 1230 extending from the fitting portion 1220, and a bent portion 1240 extending from the arm portion 1230. The bent portion 1240 extends from the front end 1211 of the arm portion 1230 and is angularly bent with respect to the arm portion 1230. A portion of the arm portion 1230 and the bent portion 1240 define the gap 1212 therebetween.

The fitting portion 1220 according to one embodiment is configured to fit with the shaft portion of the mounting shaft portion through interference fit. Therefore, a coupling force, which maintains the hanging portion 1200 with respect to the mounting shaft portion in desired orientation and position, acts between the fitting portion 1220 and the shaft portion of the mounting shaft portion. In one embodiment, in the hanging portion 1200 manufactured from the metallic wire material, the metallic wire material constituting the hanging portion 1200 is wound in a shape of a coil spring, thereby forming the fitting portion 1220. Thus, the fitting portion 1220 has a fitting hole 1221 that is defined within a coil shape. The shaft portion of the mounting shaft portion penetrates through the fitting hole 1221 in the direction of the central axis CA. That is, the shaft portion of the mounting shaft portion is inserted and fitted to the fitting hole 1221.

Referring to FIGS. 10 to 13, the hanging portion 1200 is coupled to the mounting shaft portion 1100 in the state where the shaft portion 1120 of the mounting shaft portion 1100 penetrates through and is fitted to the fitting hole 1221 of the fitting portion 1220 in the direction of the central axis CA. The dimension of an inner diameter D2 of the fitting portion 1220 (i.e., a dimension of an inner diameter D2 of the fitting hole 1221) is less than the dimension of the outer diameter D1 of the shaft portion 1120. By way of example, the difference in the dimensions of the outer diameter D1 of the shaft portion 1120 and the inner diameter D2 of the fitting portion 1220 may be in the range of 0.05 mm to 0.3 mm. Therefore, the shaft portion 1120 and the fitting portion 1220 can fit with each other through interference fit. Further, the fitting portion 1220 can apply the coupling force, which fixes the hanging portion 1200 with respect to the mounting shaft portion 1100, to the shaft portion 1120 of the mounting shaft portion 1100.

When the shaft portion 1120 of the mounting shaft portion is inserted into the fitting hole 1221 of the fitting portion 1220, the shaft portion 1120 having a greater dimension can expand the fitting portion 1220 in the circumferential direction of the central axis CA. The fitting portion 1220 is elastically deformed due to such expansion, and generates the above-described coupling force between the shaft portion 1120 and the fitting portion 1220. When the protection portion 1300 is not in contact with the hanging portion 1200, the coupling force prevents the hanging portion 1200 from rotating with respect to the mounting shaft portion 1100. Thus, when the protection portion 1300 is not in contact with the hanging portion 1200, the hanging portion 1200 is not rotated and can be fixed together with the mounting shaft portion 1100. If a rotational force stronger than the above-described coupling force is applied to the hanging portion 1200, then the hanging portion 1200 can be rotated about the central axis CA of the mounting shaft portion within a predetermined range. Due to the above-described coupling force, the hanging portion 1200 can be maintained such that the front end 1211 is directed toward the tip of the fishing rod. Therefore, the operation of hanging the fishing rig to the hanging portion 1200 can be performed effortlessly and easily. The fitting portion 1220 may have various shapes other than the above-described coil shape. The fitting portion 1220 may have any shape that is elastically deformable while generating the above-described coupling force between the hanging portion 1200 and the mounting shaft portion 1100.

Reference is made to FIGS. 8 to 10. When the protection portion 1300 is rotated between the closed position and the open position, the coupling portion 1320 of the protection portion 1300 can slide, at its circumferential surface, along the outer peripheral surface of the rod body. The coupling portion 1320 of the protection portion includes a pair of bearing portions 1321L and 1321R located opposite the pair of mounting portions 1130L and 1130R of the mounting shaft portion, respectively, and a bridge portion 1323 located between the pair of bearing portions 1321L and 1321R and interconnecting the pair of bearing portions 1321L and 1321R. A bearing hole 1322 is perforated through each of the bearing portions 1321L and 1321R in the direction of the central axis CA. The bearing holes 1322 are located respectively at the left and right sides of the fitting portion 1220 of the hanging portion. The protection portion 1300 is rotatably coupled to the mounting shaft portion 1100 in such a manner that the shaft portion 1120 of the mounting shaft portion is fitted to the bearing holes 1322. In the state where the hanger is assembled as shown in FIG. 10, the coupling portion 1320 of the protection portion 1300 is disposed between the pair of mounting portions 1130L and 1130R and the fitting portion 1220 of the hanging portion is disposed within the coupling portion 1320 of the protection portion.

Reference is made to FIGS. 13 to 15. The protection portion 1300 can be in slidable contact with the outer peripheral surface of the rod body at a surface formed at the boundary between the bearing portions 1321L and 1321R and the bridge portion 1323. The bridge portion 1323 is located at the opposite side of the arm portion 1330 with reference to the central axis CA. A surface 1324 of the bridge portion 1323 has a concavely arcuately curved shape so as to correspond to the shape of the outer peripheral surface of the rod body. The surface 1324 of the bridge portion 1323 forms a rearward surface of the protection portion 1300. Where the rod body has a small diameter, the protection portion 1300 may be in slidable contact with the outer peripheral surface of the rod body at the surface 1324 of the bridge portion 1323. In one embodiment, the coupling portion 1320 of the protection portion 1300 has an insertion portion 1325 at the bridge portion 1323. The insertion portion 1325 is formed in the bridge portion 1323 in a shape of a slit, and communicates with the accommodation portion 1340. For example, the insertion portion 1325 may be provided in the bridge portion 1323 by cutting away a portion of the bridge portion 1323 in a circumferential direction. As shown in FIG. 15, in the closed position of the protection portion, the insertion portion 1325 is located below the central axis CA of the mounting shaft portion and faces toward the outer peripheral surface of the rod body. Further, as shown in FIG. 14, the insertion portion 1325 is disposed in the same line together with the arm portion 1230 of the hanging portion, and is located close to one of the bearing portions 1321L and 1321R. As the protection portion is rotated from the closed position to the open position, the insertion portion 1325 is rotated about the central axis CA in a direction of the rotation of the protection portion. The hanging portion 1200 is supported in the state of being fixed to the mounting shaft portion, but the protection portion 1300 is rotatably coupled to the mounting shaft portion. Thus, when the protection portion is rotated, the hanging portion 1200 escapes from the accommodation portion 1340 of the protection portion and a portion of the hanging portion is inserted into the insertion portion 1325.

As the protection portion 1300 is rotated from the closed position to the open position, a front end 1311 of the protection portion 1300 is rotated rearward and the bridge portion 1323 is rotated frontward about the central axis CA. The hanging portion 1200 is fixed to the shaft portion 1120 of the mounting shaft portion and is not influenced by the rotation of the protection portion 1300. Thus, when the protection portion is rotated, a portion of the hanging portion 1200 (e.g., the arm portion 1230 of the hanging portion) is inserted to the insertion portion 1325. The coupling portion 1320 of the protection portion 1300 has a pushing-up surface 1326 formed at the insertion portion 1325. Referring to FIGS. 14 and 15, the pushing-up surface 1326 is located at an end of the insertion portion 1325 in a circumferential direction, and forms a surface of the insertion portion 1325. As the protection portion 1300 is rotated from the closed position to the open position, the insertion portion 1325 approaches a portion of the hanging portion 1200 fixed to the shaft portion 1120 (i.e., a portion of the arm portion 1230). As the protection portion 1300 is further rotated to the open position, a portion of the arm portion 1230 escapes from the accommodation portion 1340 and is inserted into the insertion portion 1325, and the pushing-up surface 1326 is brought into contact with the portion of the arm portion 1230. As the protection portion 1300 is further more rotated to the open position, a force of rotating the protection portion is applied to the arm portion 1230 through the insertion portion 1325, and the arm portion 1230 can be pushed up in the rotation direction of the protection portion together with the rotation of the protection portion in the state of being in contact with the pushing-up surface 1326. Accordingly, as the protection portion is rotated from the closed position to the open position, the coupling portion 1320 of the protection portion pushes up the portion of the hanging portion 1200, which is inserted into the insertion portion 1325 and is brought into contact with the pushing-up surface 1326, by the pushing-up surface 1326. And at the same time, the coupling portion 1320 of the protection portion can rotate the hanging portion 1200 about the central axis CA of the mounting shaft portion throughout a predetermined range.

The arm portion 1330 of the protection portion 1300 is bent toward the rod body. Therefore, in the closed position of the protection portion 1300, a space is formed between a lower surface of the arm portion 1330 and the outer peripheral surface of the rod body. The protection portion 1300 has a pressing portion 1331 at the arm portion 1330. The pressing portion 1331 presses the fish hook or the fishing line toward the outer peripheral surface of the rod body in the closed position of the protection portion. In the closed position of the protection portion, the pressing portion 1331 is located below the gap 1212 of the hanging portion 1200 and is located adjacent to the accommodation portion 1340. The pressing portion 1331 may be formed by the lower surface of the arm portion 1330.

The arm portion 1330 of the protection portion has a protruding portion 1332 located in front of the pressing portion 1331. A front end of the protruding portion 1332 is the front end 1311 of the protection portion. The protruding portion 1332 protrudes from the accommodation portion 1340 in a direction away from the central axis CA of the mounting shaft portion. The protruding portion 1332 may be formed as a portion formed by excluding a space of the accommodation portion 1340 from the arm portion 1330. The arm portion 1330 has a contact surface 1333 at the protruding portion 1332, and the contact surface 1333 forms a frontward end surface of the accommodation portion 1340 and faces toward the central axis CA. As shown in FIG. 15, the contact surface 1333 may be formed so as to be brought into contact with the front end 1211 of the hanging portion 1200, which is located between the arm portion 1230 and the bent portion 1240. When the protection portion is rotated from the open position to the closed position, the contact surface 1333 is configured to be brought into contact with the front end 1211 of the hanging portion 1200 and to press the hanging portion 1200 toward the rod body.

The accommodation portion 1340 of the protection portion 1300 accommodates the hanging portion 1200 such that the upper surface of the hanging portion 1200 and the lower surface of the protection portion 1300 do not come in contact with each other in the closed position of the protection portion 1300. The accommodation portion 1340 is formed so as to be perforated through the protection portion 1300 from below toward the top. As shown in FIG. 13, two openings 1312 and 1313 communicating with the accommodation portion 1340 are formed at an upper side of the arm portion 1330. As shown in FIG. 14, an opening 1314 communicating with the accommodation portion 1340 is formed at a lower side of the arm portion 1330, and a shape of the opening 1314 can correspond to a planar shape of the hanging portion 1200. The opening 1314 is formed from the contact surface 1333 of the protruding portion 1332 to the insertion portion 1325. As shown in FIG. 15, the accommodation portion 1340 is formed so as to accommodate the entirety of the hanging portion 1200. By way of example, the accommodation portion 1340 may be formed as a slit or hole that is perforated through the protection portion 1300 from below toward the top. By way of another example, the accommodation portion 1340 may be formed as a groove that is formed upward from the lower surface of the protection portion 1300 by a predetermined depth.

Figure 17:
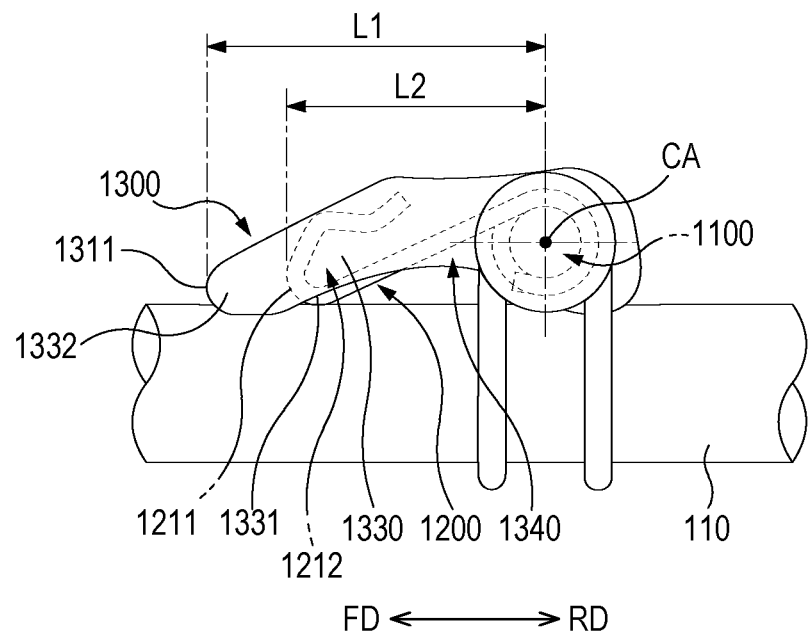
FIG. 17 is a side view showing a state where a hanger for use in fishing according to one embodiment is mounted on a rod body of a fishing rod.
Figure 18:
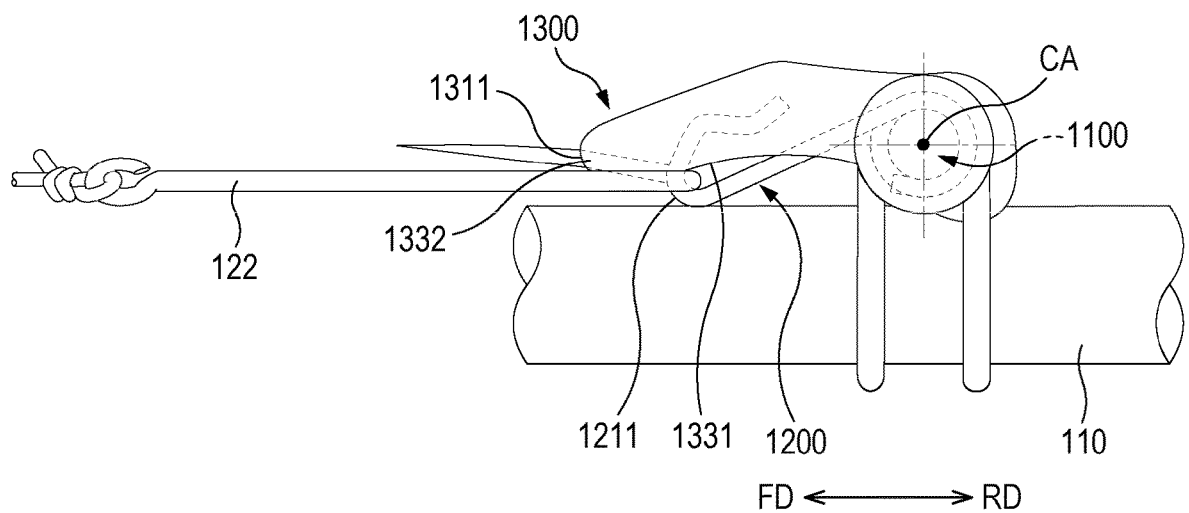
FIG. 18 is a side view showing a state where a hanger for use in fishing according to one embodiment hangs a fish hook and keeps the fish hook on a rod body.
Figure 19:
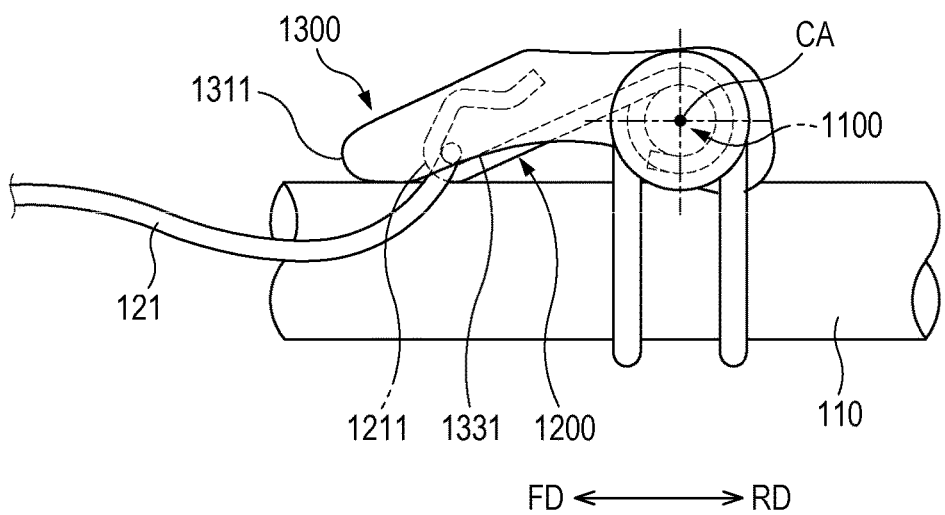
FIG. 19 is a side view showing a state where a hanger for use in fishing according to one embodiment hangs a fishing line and keeps the fishing line on a rod body.

The hanger according to one embodiment is capable of reliably pinching the fishing line or the fish hook by the hanging portion and the protection portion. FIG. 17 is a side view showing a state where the hanger according to one embodiment is mounted on the rod body of the fishing rod. FIG. 17 shows the protection portion rotated to the closed position. When the protection portion 1300 is rotated to the closed position so as to cover the hanging portion 1200, a distance L1 from the central axis CA of the mounting shaft portion to the front end 1311 of the protection portion is longer than a distance L2 from the central axis CA of the mounting shaft portion to the front end 1211 of the hanging portion. That is, due to the protruding portion 1332 of the protection portion, the front end 1311 of the protection portion protrudes frontward further than the front end 1211 of the hanging portion. When the protection portion 1300 is rotated to the closed position, the protection portion 1300 can press a portion of the fish hook or a portion of the fishing line toward the rod body 110 at a pressing portion 1331 located in rear of the protruding portion 1332. FIG. 18 is a side view showing the state where the hanger according to one embodiment hangs the fish hook and keeps the fish hook on the rod body. Referring to FIG. 18, when the protection portion 1300 is rotated to the closed position, the protruding portion 1332 protrudes frontward further than the front end 1211 of the hanging portion 1200, and the pressing portion 1331 can press a portion of the fish hook 122 hung by the hanging portion 1200 toward the rod body 110. Therefore, the hanger can reliably pinch the fish hook 122 by the hanging portion 1200 and the protection portion 1300. FIG. 19 is a side view showing a state where the hanger according to one embodiment hangs the fishing line and keeps the fishing line on the rod body. As shown in FIG. 19, when the protection portion 1300 is rotated to the closed position, the pressing portion 1331 can press a portion of the fishing line 121 hung by the hanging portion 1200 toward the rod body 110. Therefore, the hanger can reliably pinch the fishing line 121 by the hanging portion 1200 and the protection portion 1300.

Figure 20:
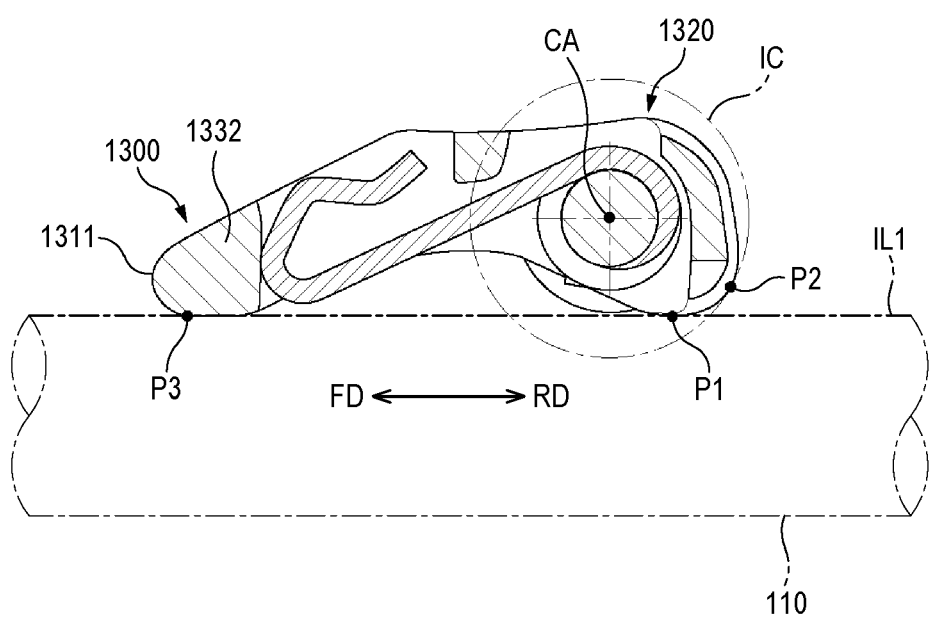
FIG. 20 is a longitudinal cross-sectional view of a hanger for use in fishing according to one embodiment.
Figure 21:
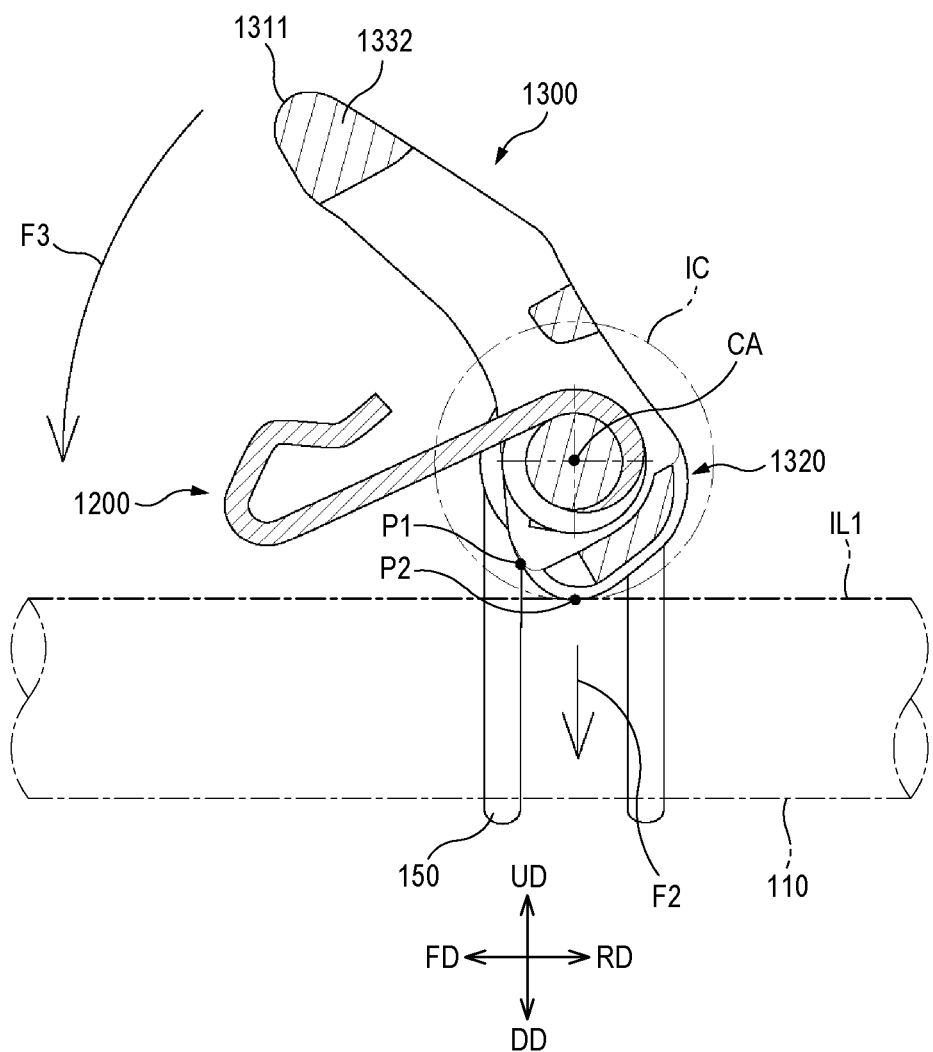
FIG. 21 is a longitudinal cross-sectional view showing a state where a protection portion according to one embodiment is in contact with an outer peripheral surface of a rod body.
Figure 22:
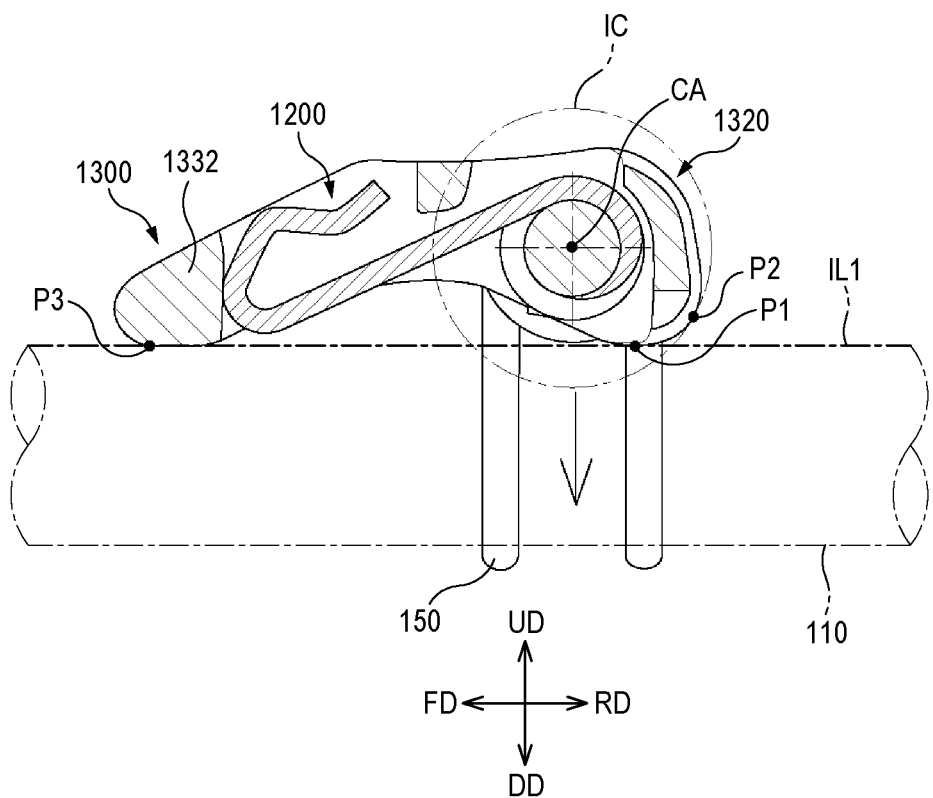
FIG. 22 is a longitudinal cross-sectional view showing a state where a protection portion according to one embodiment is in contact with an outer peripheral surface of a rod body in a closed position.

The hanger according to one embodiment is capable of maintaining the state of pinching the fish hook or the fishing line by the hanging portion and the protection portion. FIG. 20 is a longitudinal cross-sectional view of the hanger according to one embodiment. FIGS. 21 and 22 are longitudinal cross-sectional views showing a state where the protection portion according to one embodiment is in contact with the outer peripheral surface of the rod body.

As shown in FIGS. 20 and 22, when the protection portion 1300 is positioned in the closed position, the lower surface of the protection portion 1300 can be in contact with the outer peripheral surface of the rod body at two or more contact points. An imaginary line IL1 is assumed in the longitudinal cross-sectional shape of the protection portion 1300 which is taken when the hanger of one embodiment is viewed from a lateral side. The imaginary line IL1 corresponds to an uppermost position of the outer peripheral surface of the rod body 110. When the protection portion 1300 is positioned in the closed position, the lower surface of the protection portion 1300 can be in contact with the imaginary line IL1 at two or more contact points. By way of example, the lower surface of the protection portion 1300 can be in contact with the imaginary line IL1 at a first contact point P1 (a rearward contact point) and a frontward contact point P3. That is, in the state where the protection portion 1300 is in contact with the outer peripheral surface of the rod body, the coupling portion 1320 can be in contact with the outer peripheral surface of the rod body 110 at the first contact point P1, and the protruding portion 1332 can be in contact with the outer peripheral surface of the rod body 110 at the frontward contact point P3. As shown in FIG. 21, when the hanger of one embodiment is viewed from a lateral side, during the rotation of the protection portion 1300 from the closed position to the open position, the coupling portion 1320 is in contact with the outer peripheral surface of the rod body 110 (i.e., the imaginary line IL1) at a second contact point P2 that is most distant from the central axis CA of the mounting shaft portion.

An imaginary circle IC is assumed in the longitudinal cross-sectional shape of the protection portion 1300 which is taken when the hanger of one embodiment is viewed from a lateral side. The imaginary circle IC is centered on the central axis CA of the mounting shaft portion and is inscribed in the coupling portion 1320 of the protection portion. The imaginary circle IC may be in contact with one point located on an outermost contour shape of the rearward surface of the protection portion 1300 (i.e., the outermost contour shape of the coupling portion 1320). In the longitudinal cross-sectional shape of the protection portion 1300, the imaginary circle IC passes through the second contact point P2 of the coupling portion 1320 and is inscribed in the outermost contour shape of the coupling portion 1320 at the second contact point P2.

When the hanger of one embodiment is viewed from a lateral side, the coupling portion 1320 of the protection portion is configured such that the first contact point P1 is located inside the imaginary circle IC. Specifically, the coupling portion 1320 of the protection portion is formed in a shape which has an arcuately curved contour line between the first contact point P1 and the second contact point P2 such that the first contact point P1 is located inside the imaginary circle IC.

Referring to FIG. 21, when the protection portion 1300 is rotated to the closed position or the open position, a pressing force F2 pressing the protection portion 1300 downward acts due to the elastic force of the elastic band 150. When the second contact point P2 is located immediately below the central axis CA of the mounting shaft portion as shown in FIG. 21, a distance between the central axis CA of the mounting shaft portion and the imaginary line IL1 is largest and the pressing force F2 may be largest. As the protection portion 1300 is slightly rotated from the position shown in FIG. 21 to the closed position, a point of application of the pressing force F2 is spaced apart from the central axis CA and, due to a rotation moment caused by the pressing force F2, a rotational force F3 causing the front end 1311 of the protection portion 1300 to rotate in the frontward direction FD acts. That is, when the coupling portion 1320 of the protection portion 1300 is in contact with the rod body 110 at any contact point between the second contact point P2 and the first contact point P1, the pressing force F2 can generate the rotational force F3 causing the front end 1311 of the protection portion 1300 to rotate in the frontward direction FD and in the downward direction DD. As shown in FIG. 22, when the coupling portion 1320 is in contact with the rod body 110 at the first contact point P1, the pressing force caused by the elastic band can act on the first contact point P1 distant from the central axis CA. The first contact point P1 is located inside the imaginary circle IC, and the coupling portion 1320 has the arcuately curved contour line throughout the second contact point P2 and the first contact point P1. Accordingly, as shown in FIGS. 21 and 22, due to the elastic force of the elastic band 150 (i.e., the pressing force F2) and the shape of the coupling portion 1320 formed between the first and second contact points P1 and P2, the rotational force F3 causing the protection portion 1300 to rotate in the frontward direction FD and the downward direction DD can be generated and maintained, and the hanger can maintain the state of pinching the fish hook by the hanging portion 1200 and the protection portion 1300.

Figure 23:
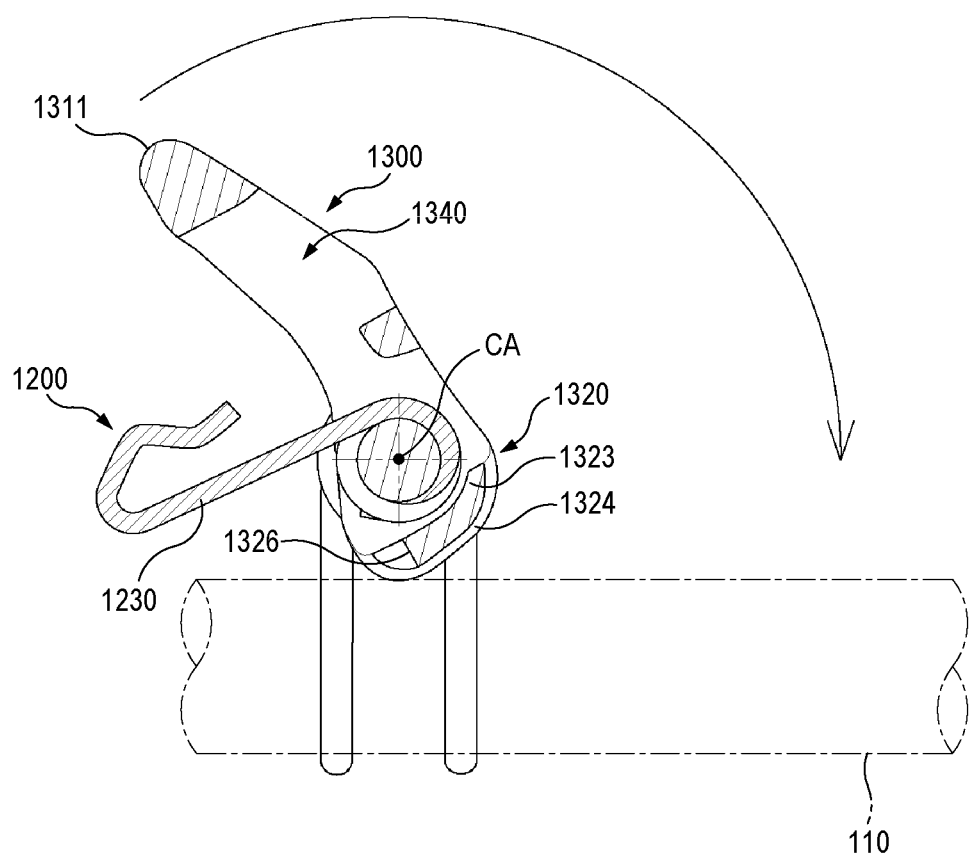
FIG. 23 is a longitudinal cross-sectional view showing a state where a protection portion according to one embodiment is being rotated to an open position.
Figure 24:
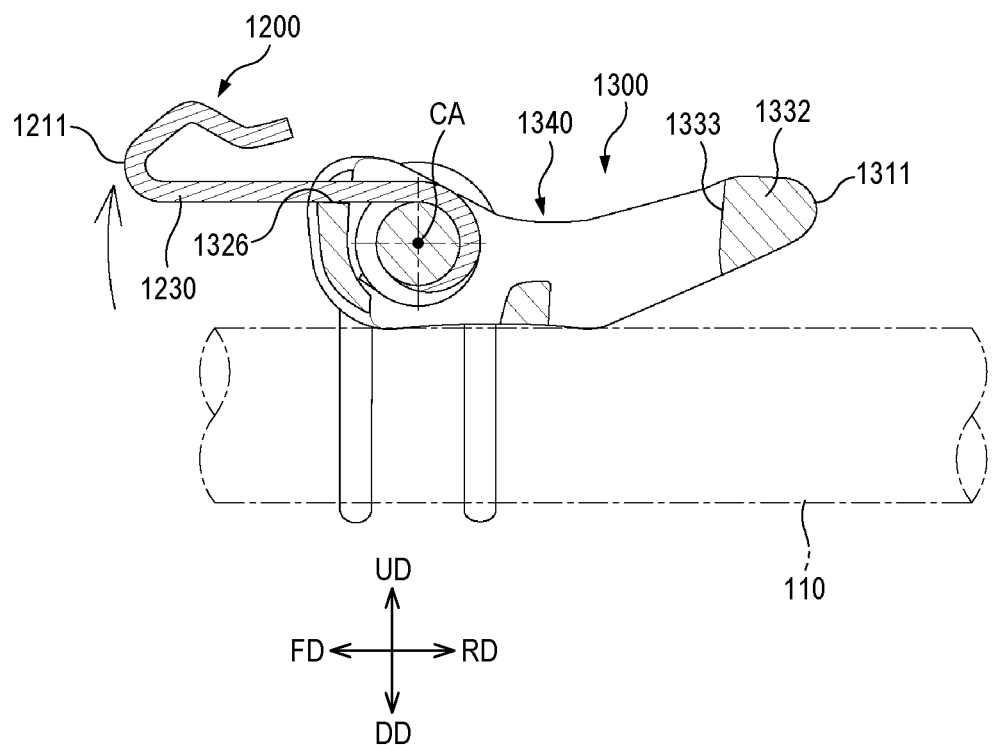
FIG. 24 is a longitudinal cross-sectional view showing a state where a protection portion according to one embodiment is rotated to the open position.

The hanger according to one embodiment is capable of changing the position of the hanging portion to facilitate the operation of hanging the fishing rig to the hanging portion. FIG. 23 is a longitudinal cross-sectional view showing a state where the protection portion according to one embodiment is being rotated to the open position, and FIG. 24 is a longitudinal cross-sectional view showing a state where the protection portion according to one embodiment is rotated to the open position.

Referring to FIG. 23, the front end 1311 of the protection portion 1300 is rotated in a direction away from the hanging portion 1200, and the protection portion 1300 is rotated to the open position that fully exposes the hanging portion 1200. During such rotation, the coupling portion 1320 slides along the outer peripheral surface of the rod body 110. Further, the pushing-up surface 1326 provided at the insertion portion approaches the lower surface of the hanging portion 1200, and the pushing-up surface 1326 is brought into contact with the lower surface of the hanging portion 1200 (i.e., the lower surface of the arm portion 1230). Referring to FIG. 24, as the front end 1311 of the protection portion 1300 is fully rotated in the rearward direction RD (i.e., in a direction toward the butt of the fishing rod), the hanging portion 1200 is rotated upward by the pushing-up surface 1326 about the central axis CA of the mounting shaft portion. That is, in the hanger according to one embodiment, as the protection portion 1300 is rotated to the open position for exposing the hanging portion 1200, the hanging portion 1200 is pushed up from the state of being close to the outer peripheral surface of the rod body 110, together with the rotation of the protection portion 1300. Since the hanging portion 1200 is pushed up, a user can effortlessly and easily hang the fish hook or the fishing line to the hanging portion 1200.

When the protection portion 1300 is rotated from the open position to the closed position and the protection portion 1300 covers the hanging portion 1200, the contact surface 1333 of the protruding portion 1332 facing toward the accommodation portion 1340 can be brought into contact with the front end 1211 of the hanging portion 1200. Therefore, if the protection portion 1300 is rotated to the closed position, due to the contact surface 1333 of the protruding portion 1332, the hanging portion 1200 can be rotated to the state of being close to the outer peripheral surface of the rod body 110.

Figure 25:
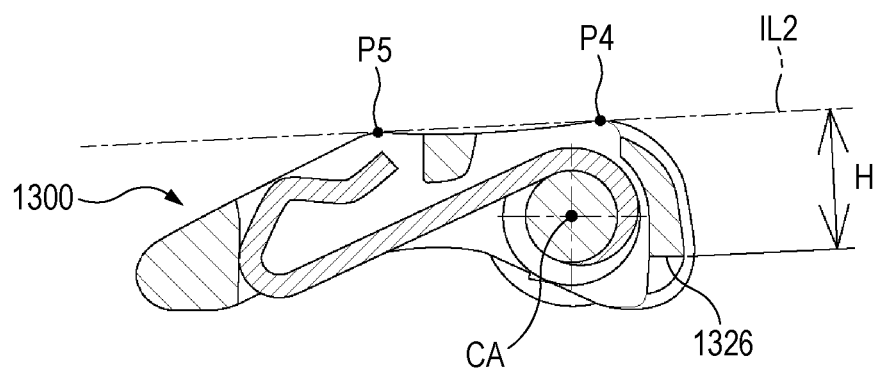
FIG. 25 is a longitudinal cross-sectional view showing a hanger for use in fishing according to one embodiment.

The hanger according to one embodiment is capable of changing a height of the hanging portion to facilitate the operation of hanging the fishing rig to the hanging portion. FIG. 25 is a longitudinal cross-sectional view showing the hanger according to one embodiment, and FIG. 26 is a longitudinal cross-sectional view showing a state where the protection portion according to one embodiment is rotated to the open position.

Referring to FIG. 25, an imaginary line IL2 in contact with the upper surface of the protection portion 1300 may be assumed. The imaginary line IL2 may be defined as a line that passes through uppermost points in the longitudinal cross-sectional shape of the protection portion 1300 when the hanger of one embodiment is viewed from a lateral side. The protection portion 1300 of one embodiment may be in contact with the imaginary line IL2 at two contact points. If the protection portion 1300 is fully rotated to the open position, the imaginary line IL2 may correspond to the uppermost position of the outer peripheral surface of the rod body 110. The shortest distance between the imaginary line IL2 and the pushing-up surface 1326 may be defined as a height H of the pushing-up surface 1326. According to one embodiment, the height H of the pushing-up surface 1326 may be in the range of 2 mm to 10 mm.

Figure 26:
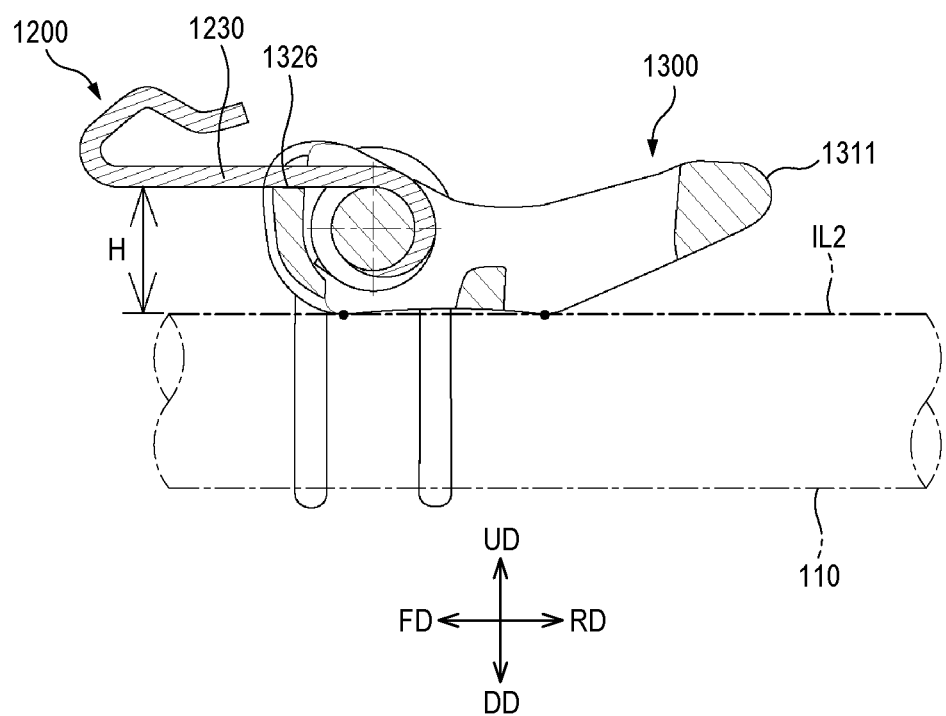
FIG. 26 is a longitudinal cross-sectional view showing a state where a protection portion according to one embodiment is rotated to the open position.

Referring to FIG. 26, as the front end 1311 of the protection portion 1300 is rotated in the direction away from the hanging portion 1200, the hanging portion 1200 is rotated in the upward direction UD by the pushing-up surface 1326, and is pushed up from the position of the hanging portion in the closed position of the protection portion 1300. Since the imaginary line IL2 is located in the uppermost position of the outer peripheral surface of the rod body 110, the arm portion 1230 of the hanging portion 1200 is spaced upward from the outer peripheral surface of the rod body 110 by the height H of the pushing-up surface 1326. Since the height H is in the range of 2 mm to 10 mm, a sufficient gap can be secured between the lower surface of the hanging portion 1200 (the lower surface of the arm portion 1230) and the uppermost position of the outer peripheral surface of the rod body 110. Thus, the operation of hanging the fish hook or the fishing line to the hanging portion 1200 can be performed effortlessly and easily.

Figure 27:
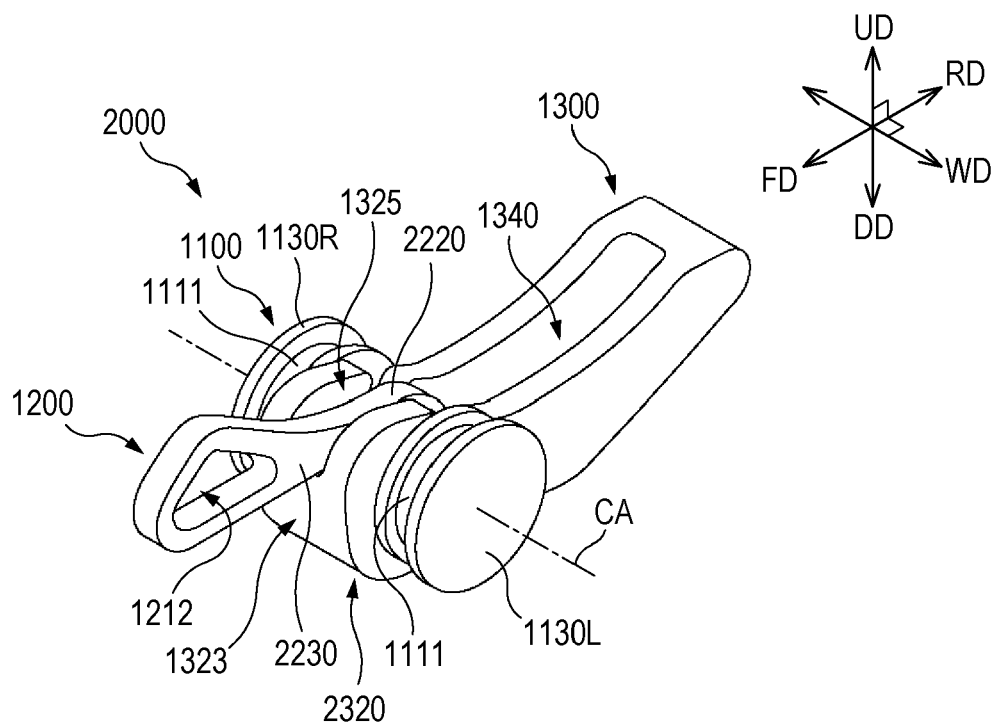
FIG. 27 is a perspective view showing a hanger for use in fishing according to another embodiment.
Figure 28:
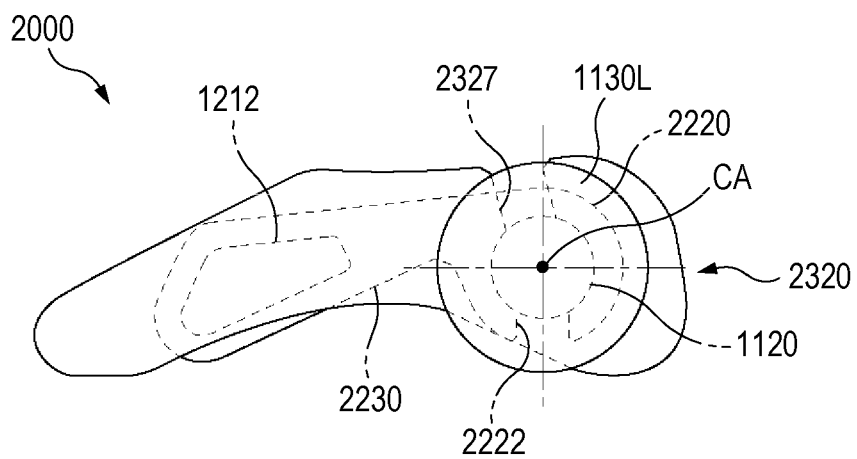
FIG. 28 is a side view of the hanger for use in fishing shown in FIG. 27.
Figure 29:
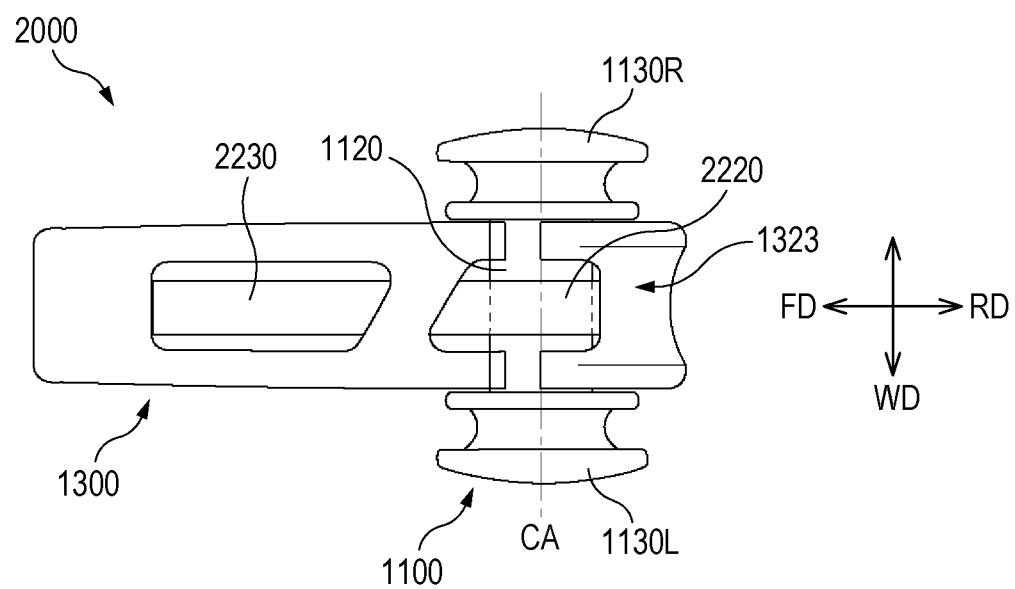
FIG. 29 is a plan view of the hanger for use in fishing shown in FIG. 27.
Figure 30:
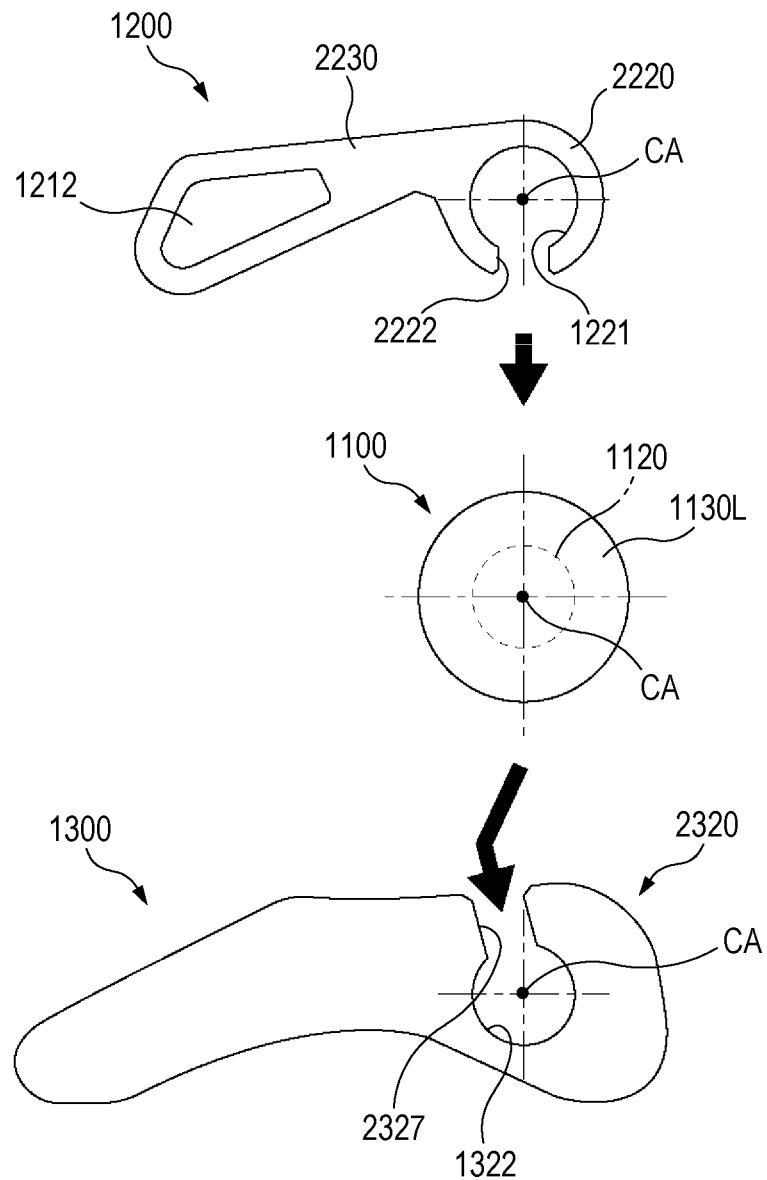
FIG. 30 is an exploded side view showing a hanging portion, a mounting shaft portion and a protection portion of the hanger for use in fishing shown in FIG. 27.
Figure 31:
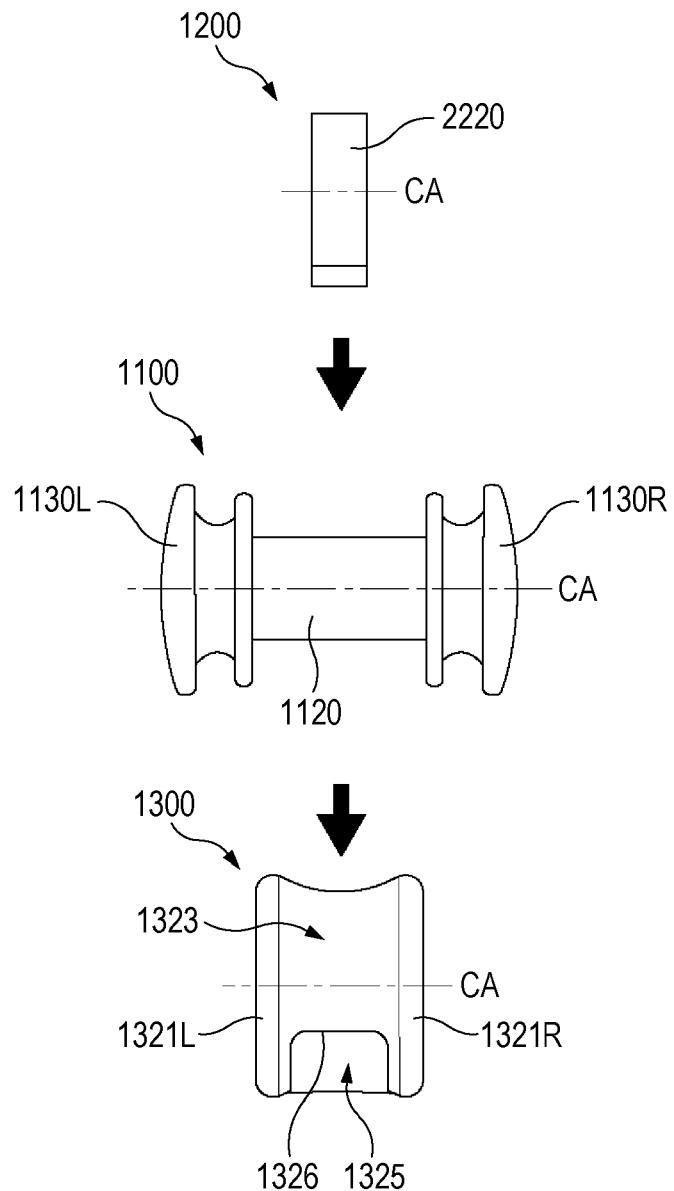
FIG. 31 is an exploded rear view showing a hanging portion, a mounting shaft portion and a protection portion of the hanger for use in fishing shown in FIG. 27.

FIGS. 27 to 31 show a hanger according to another embodiment. FIG. 27 is a perspective view of the hanger according to another embodiment, and shows the protection portion positioned in the open position. FIGS. 28 and 29 are a side view and a plan view of the hanger shown in FIG. 27, respectively, and show the protection portion positioned in the closed position. FIG. 30 is an exploded side view showing the hanging portion, the mounting shaft portion and the protection portion of the hanger shown in FIG. 27, and FIG. 31 is an exploded rear view showing the hanging portion, the mounting shaft portion and the protection portion of the hanger shown in FIG. 27. The hanger according to this embodiment has a configuration similar to the configuration of the hanger according to the above-described embodiment except that the shape of the hanging portion and the shape of the protection portion are altered in comparison with the above-described embodiment. Descriptions are made below as to the configuration of the hanger according to this embodiment which is different from the configuration of the hanger according to the above-described embodiment.

FIG. 27 shows a state where, in the hanger according to this embodiment, the protection portion 1300 is fully rotated to the open position and the hanging portion 1200 is exposed. As shown in FIGS. 27 and 29, in a hanger 2000 according to this embodiment, the hanging portion 1200 and the accommodation portion 1340 of the protection portion 1300 accommodating the hanging portion 1200 are located in the middle of the mounting shaft portion 1100 in the width direction WD.

According to this embodiment, the hanging portion 1200 may be manufactured by press forming a metallic plate material or injection molding a resin material. The protection portion 1300 may be manufactured by press forming or injection molding. The mounting shaft portion 1100 is manufactured by injection molding, and the shaft portion 1120 and the mounting portions 1130L and 1130R may be formed integrally. Accordingly, the hanger 2000 of this embodiment can be comprised of a small number of parts.

The hanging portion 1200, which may be manufactured by press forming or injection molding, can have a simpler structure. The gap 1212 of the hanging portion 1200 is formed as an opening perforated through an arm portion 2230. A fitting portion 2220 of the hanging portion 1200 is formed in a shape of a ring through which the fitting hole 1221 is perforated. A portion of the fitting portion 2220 is cut away in a circumferential direction of the fitting portion. That is, the fitting portion 2220 has the fitting hole 1221, and a slot portion 2222 communicating with the fitting hole 1221. Thus, the fitting portion 2220 has a C shape. The slot portion 2222 is located at the lower side of the fitting portion 2220. The fitting portion 2220 having the slot portion 2222 can elastically deform in the circumferential direction of the fitting portion 2220. Therefore, as shown in FIGS. 30 and 31, the fitting portion 2220 and the mounting shaft portion 1100 may be coupled to each other in such a manner that the shaft portion 1120 of the mounting shaft portion 1100 is fitted into the fitting hole 1221 of the fitting portion 2220 through the slot portion 2222 with interference fit.

A slot portion 2327 communicating with the bearing hole 1322 is formed in a coupling portion 2320 of the protection portion 1300. Therefore, the coupling portion 2320 can be rotatably coupled to the mounting shaft portion 1100 in such a manner that the shaft portion 1120 of the mounting shaft portion 1100 is fitted to the bearing hole 1322 through the slot portion 2327. The protection portion 1300 has the insertion portion 1325, which is formed by cutting away a portion of the bridge portion 1323 and into which a portion of the hanging portion 1200 is inserted. A surface of the insertion portion 1325 in the circumferential direction forms the pushing-up surface 1326. As the protection portion is rotated, the pushing-up surface 1326 is brought into contact with a portion of the hanging portion 1200 and pushes up the hanging portion 1200.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the scope of the appended claims.

What is claimed is:

1. A hanger for use in fishing mounted on a rod body of a fishing rod, comprising:
    a mounting shaft portion fixed to an outer peripheral surface of the rod body;
    a hanging portion configured to hang a fish hook or a fishing line and coupled to the mounting shaft portion so as to be rotatable about a central axis of the mounting shaft portion; and
    a protection portion rotatably coupled to the mounting shaft portion and configured to cover the hanging portion,
    wherein the protection portion includes:
        a coupling portion coupled to the mounting shaft portion so as to be rotatable about the central axis of the mounting shaft portion in a state of being in contact with the outer peripheral surface of the rod body; and
        an accommodation portion extending from the coupling portion and accommodating the hanging portion, and
    wherein the protection portion is rotatable to:
        an open position where the protection portion exposes the hanging portion and the fish hook or the fishing line is hung to the hanging portion; and
        a closed position where the protection portion covers the hanging portion and the hanging portion is accommodated in the accommodation portion such that the hanging portion and the protection portion pinch the fish hook or the fishing line.

2. The hanger for use in fishing of claim 1, wherein the protection portion includes a pressing portion located adjacent to the accommodation portion and pressing the fish hook or the fishing line toward the outer peripheral surface of the rod body in the closed position.

3. The hanger for use in fishing of claim 2, wherein the protection portion includes a protruding portion located in front of the pressing portion and protruding from the accommodation portion in a direction away from the central axis (CA) of the mounting shaft portion.

4. The hanger for use in fishing of claim 3, wherein the protection portion includes, at the protruding portion, a contact surface facing toward the central axis (CA), and
    wherein the contact surface is configured to be brought into contact with a front end of the hanging portion and to press the hanging portion toward the rod body when the protection portion is rotated from the open position to the closed position.

5. The hanger for use in fishing of claim 1, wherein the coupling portion includes:
    an insertion portion into which a portion of the hanging portion is inserted when the protection portion is rotated from the closed position to the open position; and
    a pushing-up surface formed at the insertion portion and brought into contact with the portion of the hanging portion, and
    wherein, as the protection portion is rotated from the closed position to the open position, the coupling portion rotates the portion of the hanging portion by the pushing-up surface.

6. The hanger for use in fishing of claim 1, wherein, when the hanger for use in fishing is viewed from a lateral side, the coupling portion is in contact with the outer peripheral surface of the rod body at a first contact point (P1) in a state where the protection portion is in contact with the outer peripheral surface of the rod body in the closed position, wherein, when the hanger for use in fishing is viewed from a lateral side, during rotation of the protection portion from the closed position to the open position, the coupling portion is in contact with the outer peripheral surface of the rod body at a second contact point (P2) that is most distant from the central axis (CA) of the mounting shaft portion, and wherein, when the hanger for use in fishing is viewed from a lateral side, the coupling portion is formed in a shape that has an arcuately curved contour line between the first contact point and the second contact point such that the first contact point is located inside an imaginary circle (IC), which is centered on the central axis (CA) and passes through the second contact point.

7. The hanger for use in fishing of claim 1, wherein the hanging portion includes a fitting portion coupled to the mounting shaft portion through interference fit, and wherein the fitting portion is configured to apply a coupling force, which prevents the hanging portion from rotating with respect to the mounting shaft portion when the protection portion is not in contact with the hanging portion, to the mounting shaft portion.

8. The hanger for use in fishing of claim 7, wherein the fitting portion includes a fitting hole into which the mounting shaft portion is fitted, and a slot portion communicating with the fitting hole, and wherein the mounting shaft portion is interference-fitted to the fitting hole through the slot portion.

9. The hanger for use in fishing of claim 1, wherein the mounting shaft portion includes:

a shaft portion to which the hanging portion and the protection portion are coupled; and a pair of mounting portions respectively provided at both ends of the shaft portion, wherein an elastic band for fixing the mounting shaft portion to the rod body is engaged with the pair of mounting portions, and wherein at least one of the pair of mounting portions is configured to fit with the shaft portion.

10. A fishing rod comprising:

a rod body; and a hanger comprising:

a mounting shaft portion fixed to an outer peripheral surface of the rod body;

a hanging portion configured to hang a fish hook or a fishing line and coupled to the mounting shaft portion so as to be rotatable about a central axis of the mounting shaft portion; and a protection portion rotatably coupled to the mounting shaft portion and configured to cover the hanging portion, wherein the protection portion includes:

a coupling portion coupled to the mounting shaft portion so as to be rotatable about the central axis of the mounting shaft portion in a state of being in contact with the outer peripheral surface of the rod body; and an accommodation portion extending from the coupling portion and accommodating the hanging portion, and wherein the protection portion is rotatable to:

an open position where the protection portion exposes the hanging portion and the fish hook or the fishing line is hung to the hanging portion; and a closed position where the protection portion covers the hanging portion and the hanging portion is accommodated in the accommodation portion such that the hanging portion and the protection portion pinch the fish hook or the fishing line;

wherein the hanger is mounted on the outer peripheral surface of the rod body by an elastic band, which is wound around the outer peripheral surface of the rod body and is engaged with the mounting shaft portion of the hanger for use in fishing.

* * * * *